United States Patent
Been

(10) Patent No.: US 12,230,163 B2
(45) Date of Patent: Feb. 18, 2025

(54) LUMBAR SPINE STRETCH LIMITER ASSEMBLY

(71) Applicant: Humanetics Innovative Solutions, Inc., Farmington Hills, MI (US)

(72) Inventor: Bernard Willem Been, The Hague (NL)

(73) Assignee: Humanetics Innovative Solutions, Inc., Farmington Hills, MI (US)

( * ) Notice: Subject to any disclaimer, the term of this patent is extended or adjusted under 35 U.S.C. 154(b) by 776 days.

(21) Appl. No.: 17/148,055

(22) Filed: Jan. 13, 2021

(65) Prior Publication Data

US 2021/0217328 A1 Jul. 15, 2021

Related U.S. Application Data

(60) Provisional application No. 62/960,938, filed on Jan. 14, 2020.

(51) Int. Cl.
G09B 23/32 (2006.01)
(52) U.S. Cl.
CPC .................................. G09B 23/32 (2013.01)
(58) Field of Classification Search
CPC ... G09B 23/32; G09B 23/28; G01M 17/0078; G01M 17/08; G01M 99/00
USPC ......................................................... 434/274
See application file for complete search history.

(56) References Cited

U.S. PATENT DOCUMENTS 6,000,753 A * 12/1999 Cone, II ............... B60N 2/2806
297/256.16
7,712,387 B2 5/2010 Hwang et al.
(Continued)

FOREIGN PATENT DOCUMENTS

CN 101383107 A 3/2009
EP 3040960 A1 7/2016
(Continued)

OTHER PUBLICATIONS

European Search Report for Application No. EP 21 15 1576.2, dated Feb. 17, 2021, 2 pages.
(Continued)

*Primary Examiner* — Peter S Vasat
*Assistant Examiner* — Stephen Alvesteffer
(74) *Attorney, Agent, or Firm* — Howard & Howard Attorneys PLLC

(57) ABSTRACT

A lumbar spine stretch limiter assembly for an anthropomorphic test device functions to limit the ultimate stretching of an elastic lumbar spine member during crash test simulations such as far side impact crash simulations. The lumbar spine stretch limiter assembly includes a belt assembly including one or more belts coupled to the thoracic spine and sacrum and disposed between the elastic lumbar spine member and a lumbar mounting wedge. During far side impact crash simulations, a portion of the belt assembly is brought into contact with the stretching elastic lumbar spine member to prevent further elongation of the lumbar spine member beyond a maximum allowable limit corresponding to a natural response of the lumbar spine region of a human to improve reproducibility of head excursion data and to prevent or minimize damage to the elastic lumbar spine member during far side impact crash simulations.

20 Claims, 12 Drawing Sheets

(56) References Cited

U.S. PATENT DOCUMENTS

| | | | |
|---|---|---|---|
| 9,063,029 B2 | 6/2015 | Forbes et al. | |
| 2008/0318195 A1 | 12/2008 | Murdach | |
| 2013/0000425 A1* | 1/2013 | Arthur | G09B 23/28 73/866.4 |
| 2020/0369333 A1* | 11/2020 | Lavalley | B25J 11/0035 |

FOREIGN PATENT DOCUMENTS

| | | |
|---|---|---|
| JP | H08240509 A | 9/1996 |
| JP | 2011508204 A | 3/2011 |
| JP | 2015210105 A | 11/2015 |
| WO | 2019052608 A1 | 3/2019 |

OTHER PUBLICATIONS

English language abstract for JP 2011-508204 A extracted from espacenet.com database on Mar. 10, 2022, 1 page.
English language abstract for JP 2015-210105 A extracted from espacenet.com database on Mar. 10, 2022, 1 page.
English language abstract for WO 2019/052608 A1 extracted from espacenet.com database on Mar. 10, 2022, 1 page.
Chinese Search Report for Application CN 2021100484353 dated Jul. 28, 2023, 4 pages.
English language abstract for CN 101383107 A extracted from espacenet.com database on Aug. 18, 2023, 1 page.
English language abstract for JPH 08-240509 A extracted from espacenet.com database on Aug. 18, 2023, 1 page.

\* cited by examiner

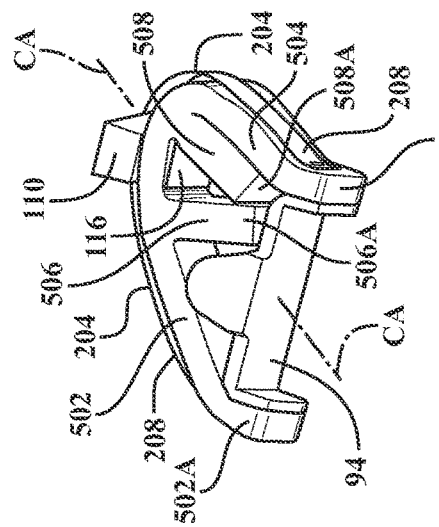
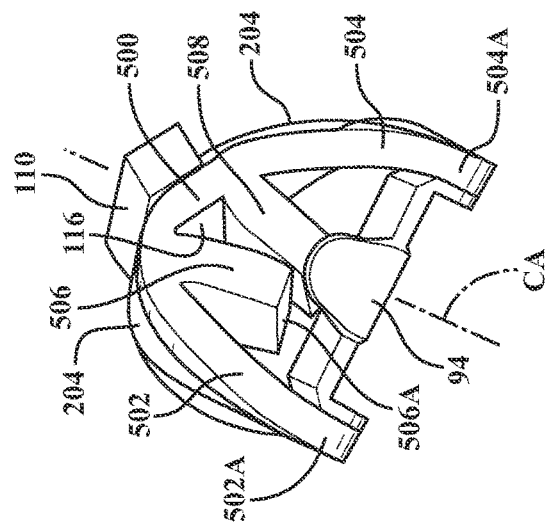
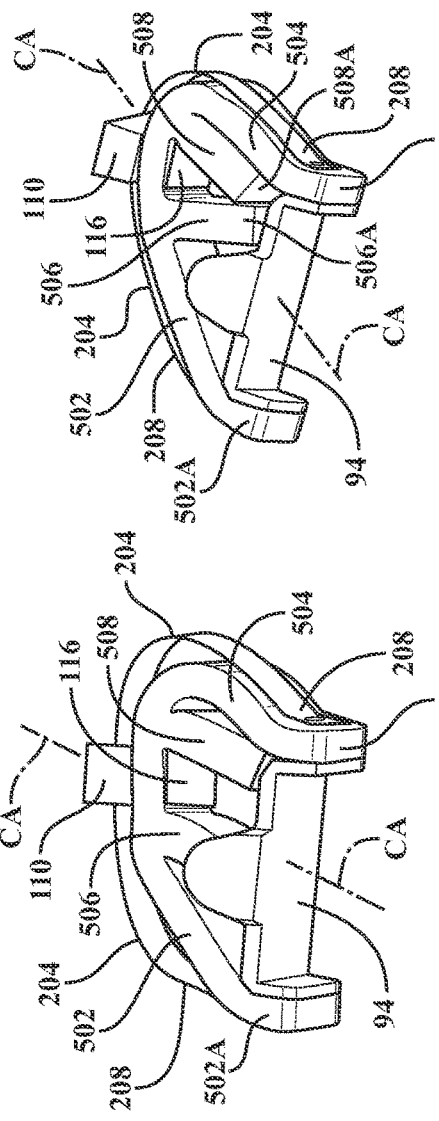
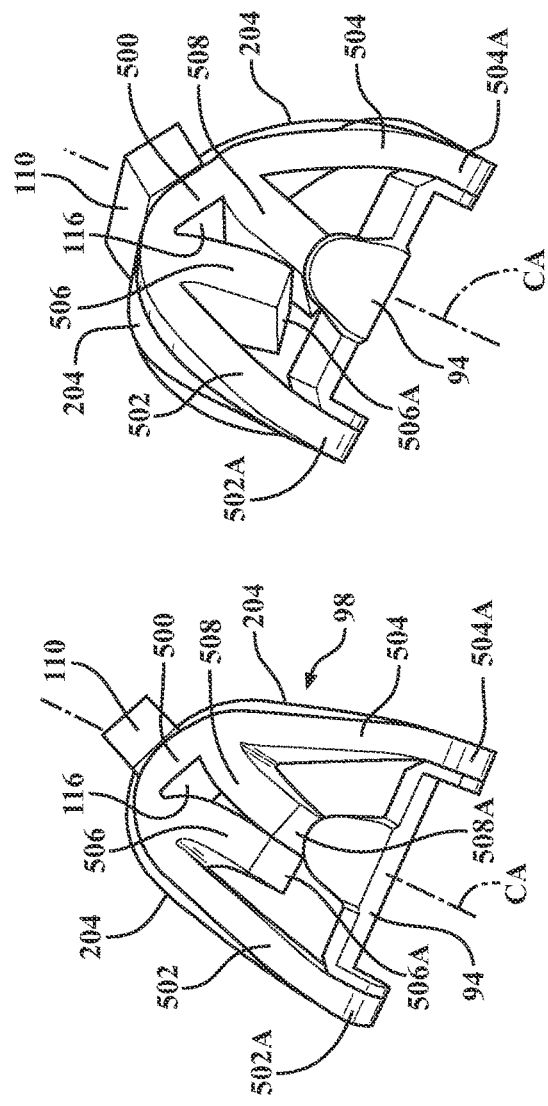
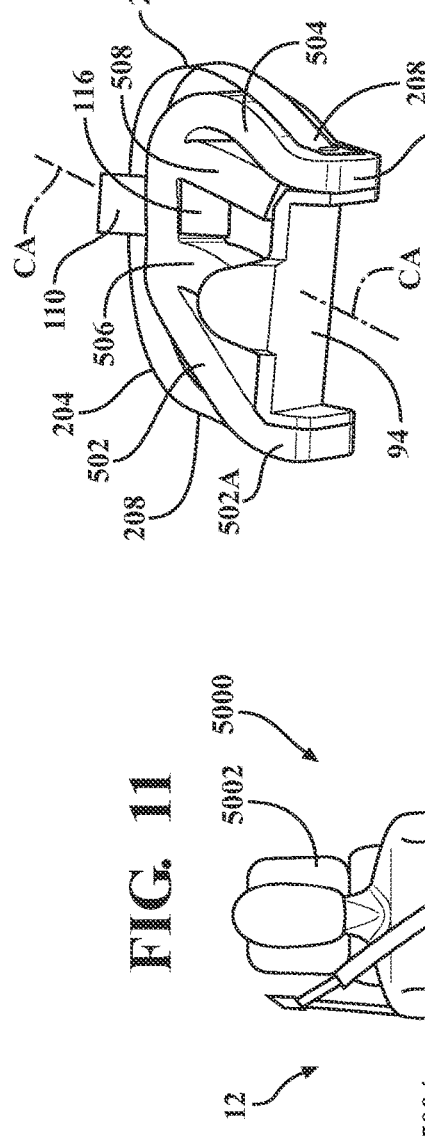

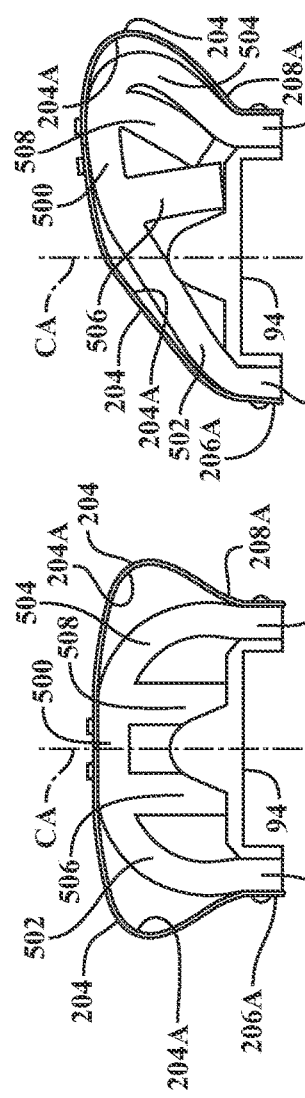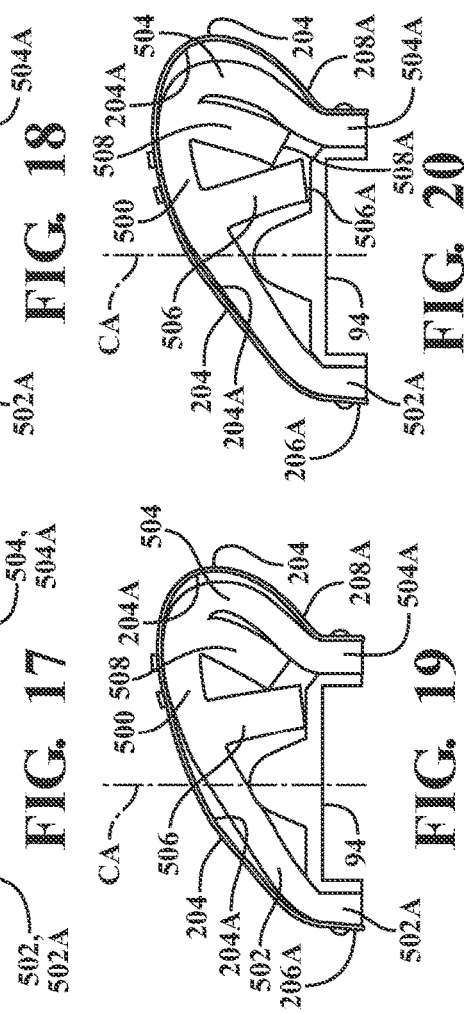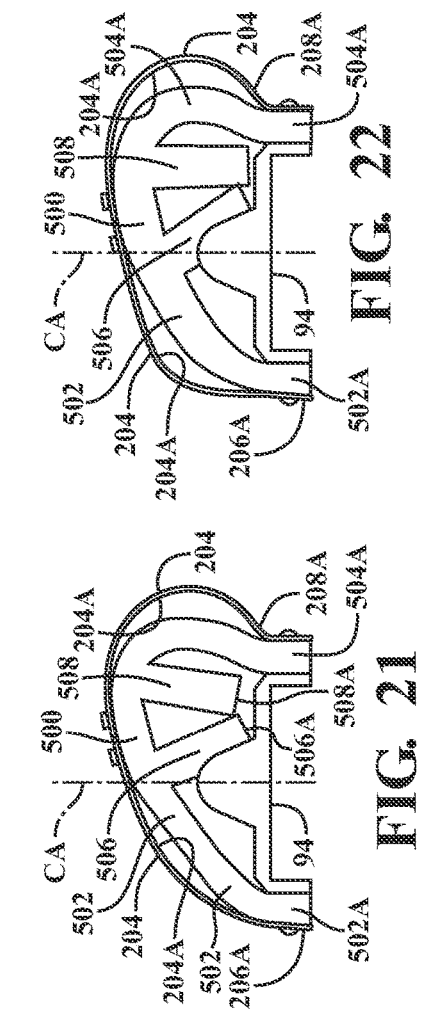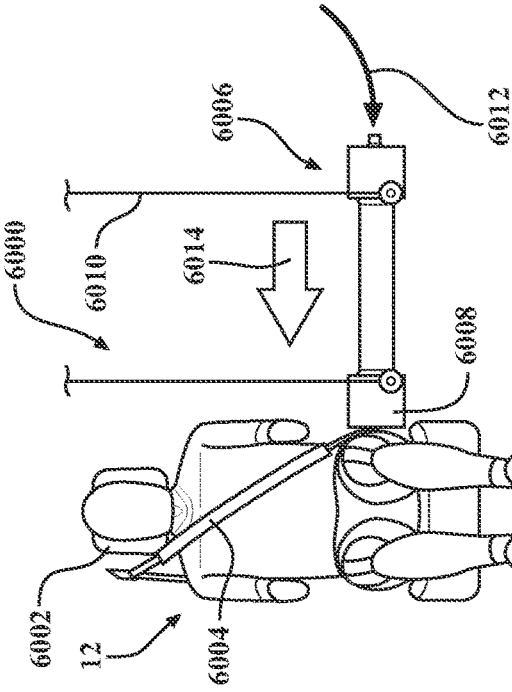

LUMBAR SPINE STRETCH LIMITER ASSEMBLY

CROSS-REFERENCE TO RELATED APPLICATIONS

The subject application claims priority to and all the benefits of U.S. Provisional Patent Application No. 62/960,938, filed on Jan. 14, 2020, the disclosure of which is hereby incorporated by reference.

BACKGROUND OF THE INVENTION

1. Field of the Invention

The present disclosure relates generally to anthropomorphic test devices and, more particularly, to lumbar spine stretch limiter assembly for an anthropomorphic test device.

2. Description of the Related Art

Automotive, aviation, and other vehicle manufacturers conduct a wide variety of collision testing to measure the effects of a collision on a vehicle and its occupants. Through collision testing, sometimes otherwise referred to as crash testing, a vehicle manufacturer gains valuable information that can be used to improve the vehicle.

Collision testing often involves the use of anthropomorphic test device, sometimes alternatively referred to as anthropomorphic mannequins, and better known as "crash test dummies", to estimate a human's injury risk.

The crash test dummy typically includes a head assembly, spine assembly (including neck), rib cage assembly, abdomen, lumbar spine, pelvis assembly, right and left arm assemblies, and right and left leg assemblies. Generally, the arm assembly has an upper arm assembly and a lower arm assembly. The upper arm assembly is typically connected to a shoulder assembly, which, in turn, is typically connected to the spine assembly. Joints are provided to couple various assemblies together and to allow articulation that simulates the human range of motion.

In addition, these assemblies are typically covered with a simulated flesh that includes an inner foam material covered with a skin. The anthropomorphic test device must possess the general mechanical properties, masses, joints, and joint stiffness of the humans of interest. In addition, the anthropomorphic test device must possess sufficient mechanical impact response to cause them to interact with the vehicle's interior in a human-like manner during the collision testing.

In certain crash test dummies, the pelvis assembly includes a lumbar spine member between the lumbar spine and a lumbar mounting bracket. The lumbar spine member is made of an elastomeric material such as rubber that is designed to flex and stretch during side impact crash simulations in a manner similar to the lumbar spine member of a human. In particular, the crash test dummy including the elastomeric lumbar spine member was developed for near side crash test conditions to decouple (i.e., be flexible) the sacrum and spine in shear test conditions.

The present disclosure addresses the lumbar spine area of an anthropomorphic test device.

SUMMARY OF THE INVENTION

The present disclosure provides an anthropomorphic test device, or crash test dummy, that includes features for limiting the stretching movement of the lumbar spine member during a crash simulation so as to correspond to a natural response of the lumbar spine region of a human during a side impact condition.

The crash test dummy includes a pelvis assembly having a lumbar mounting bracket defining a central axis, a lumbar spine member attached to the lower lumbar mounting bracket, the lumbar spine member formed from an elastomeric material, a pair of lumbar clamping plates coupled on opposing sides of the lumbar spine member relative to the central axis, and a lumbar mounting wedge attached to the lumbar spine member. The crash test dummy also includes a lumbar stretch limiter assembly for limiting the stretching movement of the lumbar spine member during a crash simulation. The lumbar stretch limiter assembly includes a belt assembly having one or more belts, with each one of the one or more belts respectively mounted to one or both of the pair of lumbar clamping plates.

The lumbar spine stretch limiter assembly is configured to limit the amount of stretch of the elastic lumbar spine member during side impact crash simulations, such as in far side impact testing, while not affecting shear behavior between the sacrum and the thoracic spine in the near side condition. Stated another way, the limiter assembly prevents over-stretching of the lumbar in a far side condition during side impact crash simulations. The inclusion of the lumbar stretch limiter assembly improves the durability of the crash test dummy and also improves the crash test dummy's head excursion reproducibility as compared with crash test dummies including the same components but not including the lumbar stretch limiter assembly.

Other features and advantages of the present disclosure will be readily appreciated, as the same becomes better understood, after reading the subsequent description taken in conjunction with the accompanying drawings.

BRIEF DESCRIPTION OF THE DRAWINGS

FIG. 11 is a perspective view of a side impact crash simulator for evaluating far side impact on a crash test dummy.

FIG. 12-15 are perspective views of a portion of the crash test dummy of FIGS. 2-6 during a side impact condition within the side impact crash simulator of FIG. 11 at multiple time intervals of 47 milliseconds, 60 milliseconds, 97 milliseconds and 129 milliseconds.

FIG. 16 is a perspective view of a pendulum side impact crash simulator for evaluating far side impact on a crash test dummy.

FIG. 17-22 are perspective views of a portion of the crash test dummy of FIGS. 2-6 during a pendulum side impact condition within the pendulum side impact crash simulator of FIG. 16 at multiple time intervals of 47 milliseconds, 60 milliseconds, 97 milliseconds and 129 milliseconds.

DESCRIPTION OF THE PREFERRED EMBODIMENT(S)

Figure 1:
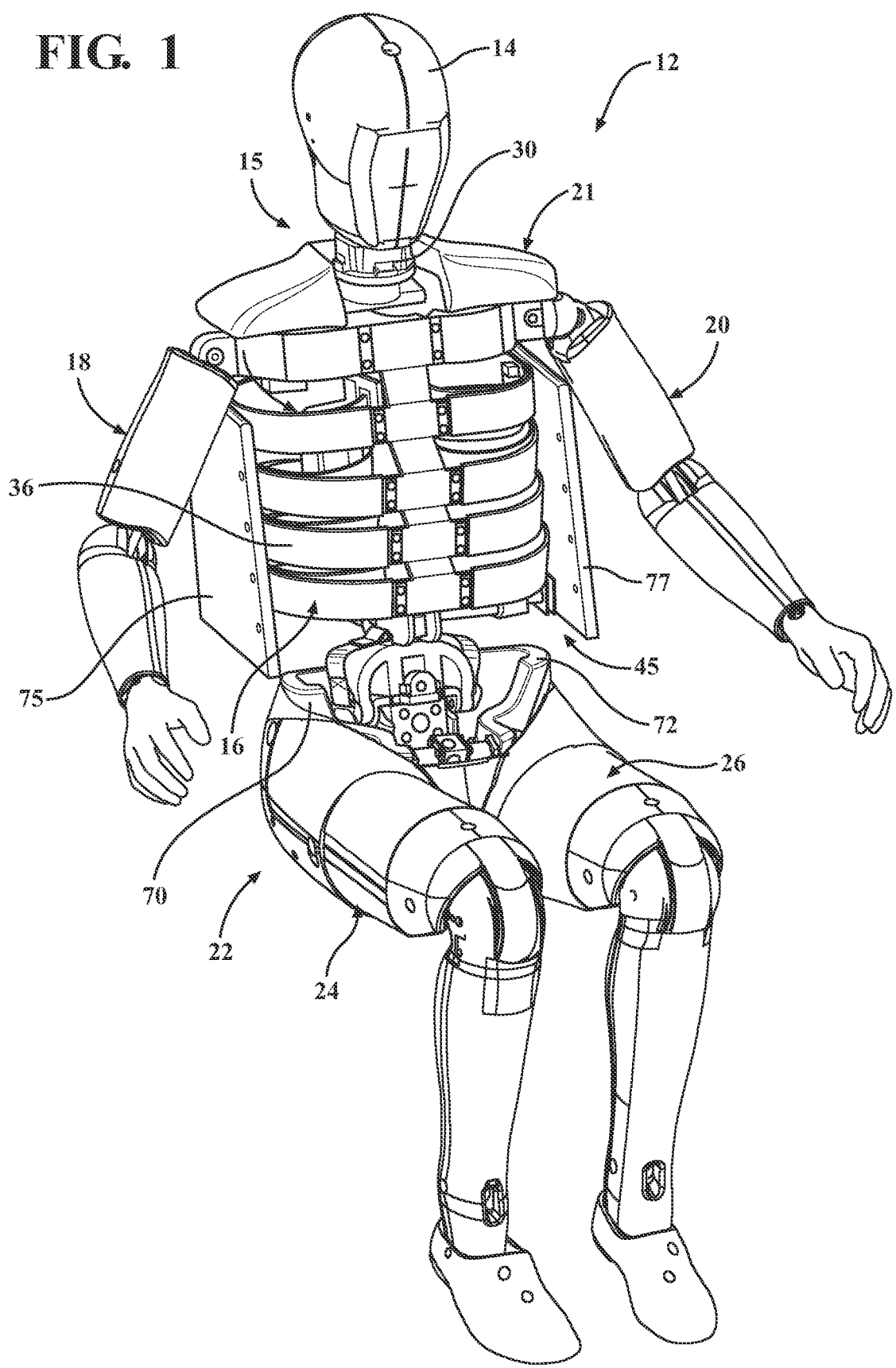
FIG. 1 is a perspective view of a crash test dummy.

Referring to the drawings and in particular to FIG. 1, one embodiment of an anthropomorphic test device, or crash test dummy, according to the present invention, is generally indicated at 12. In one embodiment, the crash test dummy 12 is of a fiftieth percentile (50%) male type and is illustrated in a sitting position. This crash test dummy 12 is used primarily to test the performance of vehicle interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data. It should also be appreciated that the crash test dummy 12 may be of any suitable size.

As illustrated in FIG. 1, the crash test dummy 12 includes a head assembly, generally indicated at 14. The crash test dummy 12 also includes a spine assembly, generally indicated at 15, having an upper end including a neck 30 mounted to the head assembly 14 and a lower end extending into a torso area of the crash test dummy 12.

The torso area of the crash test dummy 12 includes a rib cage assembly, generally indicated at 16, connected to the spine assembly 15. The crash test dummy 12 also has a pair of arm assemblies including a right arm assembly, generally indicated at 18, and a left arm assembly, generally indicated at 20, which are attached to the crash test dummy 12 via a shoulder assembly, generally indicated at 21. It should be appreciated that a lower end of the spine assembly 15 is connected to a lumbar-thoracic adapter (not shown), which is connected to a lumbar to pelvic adapter (not shown).

As best illustrated in FIG. 1, the crash test dummy 12 includes a pelvis assembly, generally indicated at 22, connected to a pelvis/lumbar spine mounting block of the spine assembly 15. The crash test dummy 12 includes a right leg assembly 24 and a left leg assembly 26, which are attached to the pelvis assembly 22. It should be appreciated that various components of the crash test dummy 12 may be covered in a polyvinyl skin such as a flesh and skin assembly for biofidelity of the crash test dummy 12.

The rib cage assembly 16 includes a sternum spaced forwardly from the spine box. The sternum is generally inverted "V" shaped but may be any suitable shape. The rib cage assembly 16 also includes one or more ribs 36 extending between the spine box and sternum. The ribs 36 are generally arcuate in shape and generally rectangular in cross-sectional shape but may be any suitable shape. The ribs 36 are vertically spaced along the spine box and the sternum. The ribs 36 are connected to the spine box and the sternum by a suitable mechanism such as fasteners. The crash test dummy 12 may also optionally include an internal organ assembly that is at least partially disposed within a cavity 45 defined within the rib cage assembly 16 and the pelvis assembly 22. Still further, the crash test dummy 12 may also include an abdominal muscle layer to hold the internal organ assembly in place. Also, the crash test dummy typically includes a pair of side plates 75, 77 disposed outwardly of the rib cage assembly 16.

Referring now to FIGS. 2-9, a close-up view of the pelvis assembly 22, according to three alternative embodiments the present invention, is shown including a lumbar stretch limiter assembly 200 in one of three alternative embodiments in operational relationship with the crash test dummy 12.

Figure 2:
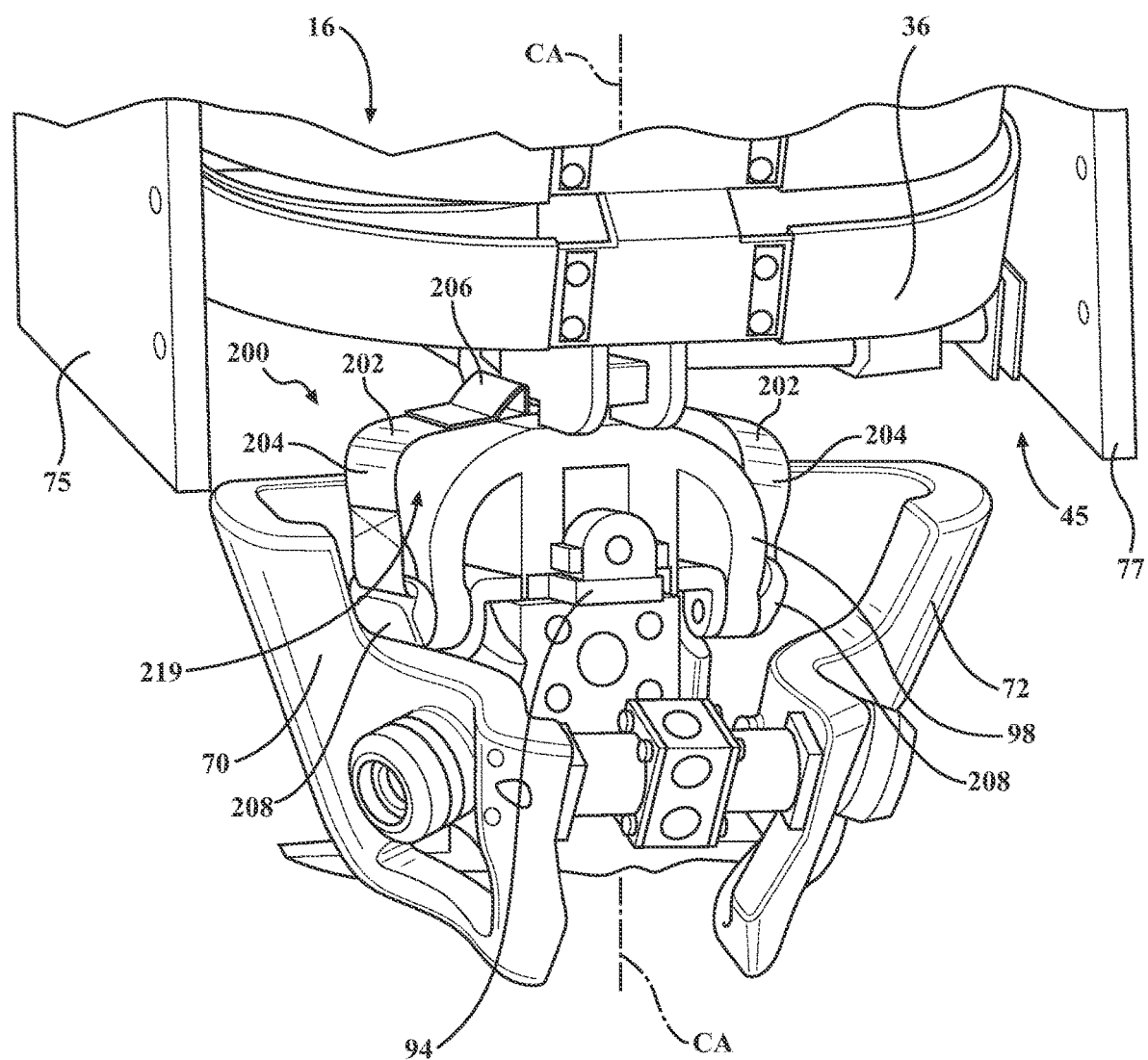
FIG. 2 is a perspective view of a portion of a pelvis assembly including a lumbar spine stretch limiter assembly in accordance with one embodiment
Figure 3:
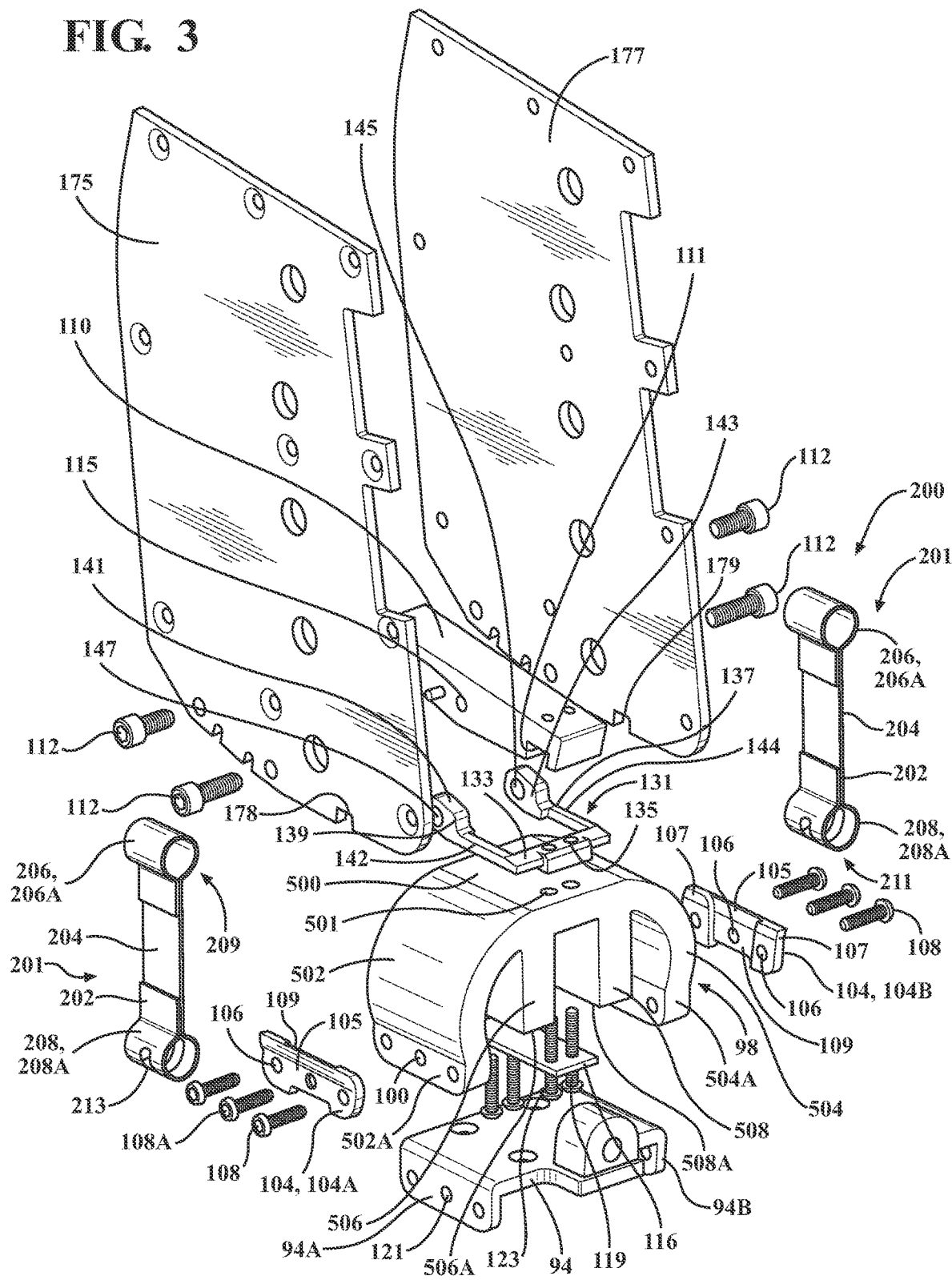
FIG. 3 is an exploded view of the lumbar spine stretch limiter assembly of FIG. 2 in accordance with one embodiment.

In each of the three alternative embodiments, as best shown in the first embodiment of FIG. 2 which is representative of all three alternative embodiments, the pelvis assembly 22 includes a pair of pelvic bone members, preferably a right pelvic bone member 70 and a left pelvic bone member 72. The pelvic bone members 70, 72 are made of a plastic material such as a thermoset plastic material. In certain embodiments, the thermoset plastic material may include a blend of TDI-terminated polyether prepolymers, such as those sold under the tradename Adiprene® which are commercially available from Chemtura Corporation (now LanXess AG of Cologne Germany). It should be appreciated that the polyether prepolymer blend is cured with commercially available diamine curative. It should also be appreciated that the polyether prepolymer blend is adjusted to achieve the specific static and dynamic properties required for a particular application. It should further be appreciated that the pelvic bone members 70, 72 may include a plurality of apertures to allow fasteners to extend through and a plurality of aperture to allow members to extend through.

The pelvis assembly 22 also includes a lumbar spine member 98 attached to a lumbar mounting bracket 94. The lumbar spine member 98 defines a plurality of lower apertures 100 (see FIG. 3) extending therethrough on each side thereof. The lumbar spine member 98 is made of an elastomeric material. The pelvis assembly 22 may also include a plurality of lumbar bushings (not shown) disposed in the lower apertures 100 and an lumbar clamping plate 104 coupled to, and disposed on, the opposing sides 98A, 98B of the lumbar spine member 98. The respective opposing sides 98A, 98B of the lumbar spine member 98, as defined herein, refers to outer surfaces of the lumbar spine member 98 that are located on opposite sides of a central axis CA (see FIG. 4).

In certain embodiments, as also shown in FIG. 2, the lumbar spine member 98 includes a base region 500 disposed along the central axis CA that defines a plurality of apertures 501. The lumbar spine member 98 includes a pair of outer legs 502, 504 extending outwardly away from the central axis from opposing sides 98A, 98B of the base region 500 relative to the central axis CA and having a length $L_1$, with in certain embodiments a curvature of the outer legs 502, 504 curving in a direction towards the lower lumbar bracket 94 so as to form downward "c-shape" and hence so as to further define the pair of outer legs 502, 504 as a pair of curved outer legs 502, 504. Still further, in certain embodiments as also shown in FIG. 2, a pair of spaced apart inner legs 506, 508 having a length $L_2$ may also extend from the base region 500 towards the lower lumbar bracket 94. The inner legs 506, 508 are typically straight along their length, with the terminal ends 506A, 508B opposite the base region 500 positioned onto, but not affixed or otherwise secured to, the lower lumbar bracket 94. Further, the terminal ends 502A, 504A of the outer legs 502, 504 are typically disposed outwardly of the opposing flanged sides 94A, 94B of the lower lumbar bracket 94, relative to the central axis CA, and are affixed to the lower lumbar bracket 94, as described further below. The terminal ends 502A, 504A of the outer legs 502, 504 further defines the plurality of apertures 100.

Figure 4:
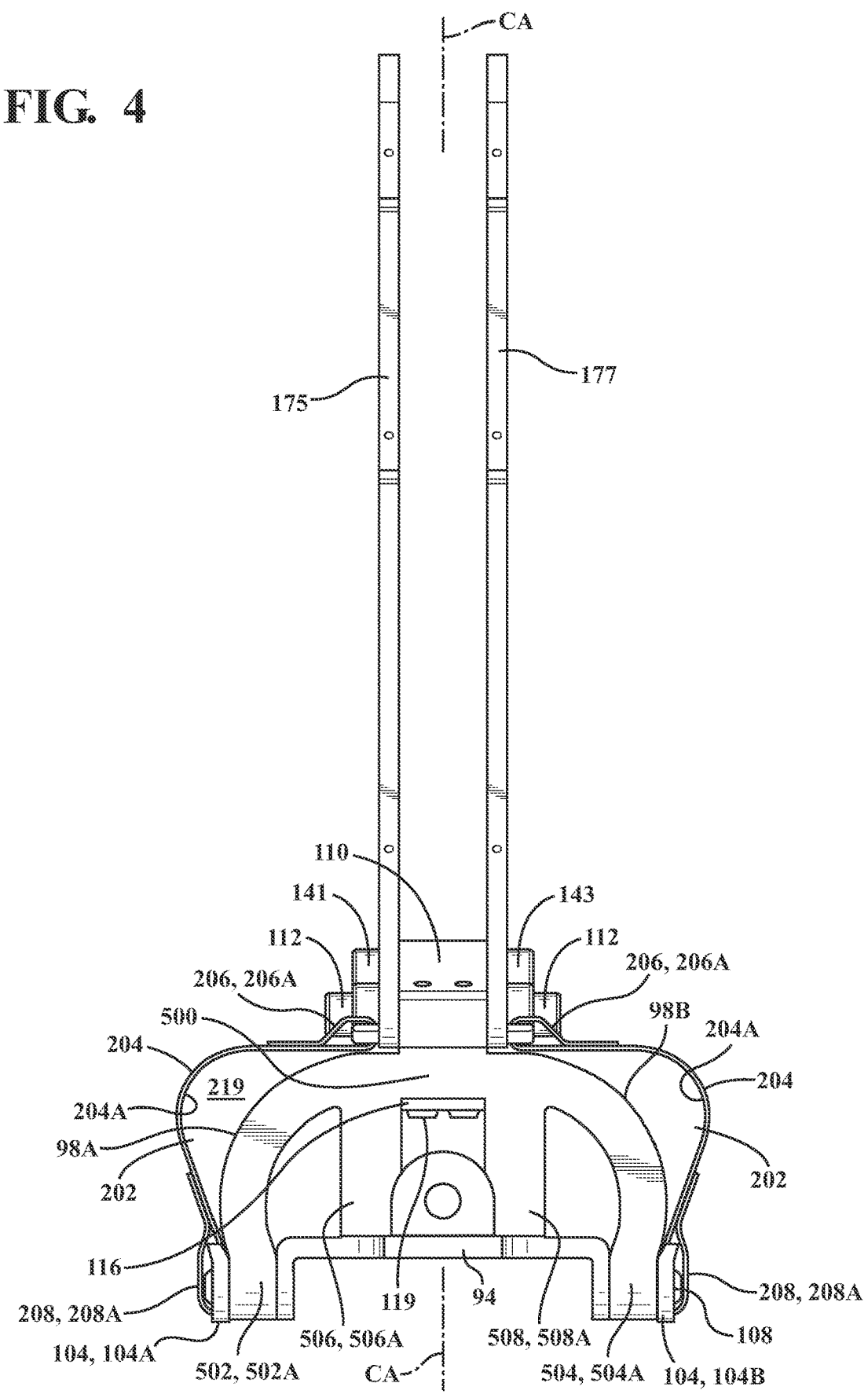
FIG. 4 is a perspective view of the lumbar spine stretch limiter assembly of FIG. 3 in an assembled state.

The lengths $L_1$ and $L_2$ are illustrated in FIG. 4 as vertical lengths for ease of illustration but are defined as the respective lengths running along an exterior surface between the base region 500 and their respective terminal ends 502A, 504A, 506A, 508A and may be curved or straight. In certain embodiments, such as illustrated in the FIGS., the length $L_1$ of the outer legs 502, 504 is longer than the length $L_2$ of inner legs 506, 508. Still further, in certain embodiments, the lengths $L_1$ of the respective outer legs 502, 504 are the same. Yet still further, in certain embodiments, the lengths $L_2$ of the respective inner legs 506, 508 are the same.

As also shown in FIGS. 2 and 4, the lumbar clamping plate 104 includes a pair of lumbar clamping plates 104A and 104B respectively coupled to, and disposed on, the respective opposing sides 98A, 98B of the lumbar spine member 98 relative a central axis CA. Stated another way, a first one 104A of the respective pair of lumbar clamping plates 104 is coupled to, and disposed on, one side of the lumbar spine member 98 relative the central axis CA, while a second one 104B of the respective pair of lumbar clamping plates 104 is coupled to, and disposed on, an other side of the lumbar spine member 98 relative the central axis CA (shown as the right lumbar clamping plate 104A and left lumbar clamping plate 104B when viewed from the perspective of the crash test dummy 12 as shown in FIG. 1 and the pelvis assembly 22 as shown in FIG. 2). More in particular, the first one 140A of the pair of lumbar clamping plates 104 is coupled to, and disposed on, the outer side of the terminal end 502A of the first spaced apart outer leg 502, while the second one 140B of the pair of lumbar clamping plates 104 is coupled to, and disposed on, the outer side of the terminal end 504A of the second spaced apart outer leg 504.

Each lumbar clamping plate 104. 104A, 104B has a main body portion 105 (see FIG. 3) and a pair of flange portions 107 (see FIG. 3) extending inwardly from the main body portion 105, and in particular extending inwardly from the main body portion 105 in a direction towards the lumbar spine member 98 and the central axis CA, and more in particular in certain embodiments extending inwardly in a direction towards the terminal end 502A, 504A of the respective first or second spaced apart outer leg 502, 504. The main body portion 105 and flange portions 107 define a plurality of apertures 106 extending therethrough. The main body portion 105 defines a central recessed region 109 (see FIG. 3) extending between the respective pair of flange portions 107.

The pelvis assembly 22 also includes a plurality of fasteners 108 such as screws extending through the apertures 106 in the clamping plates 104 and the aperture 100 of the lumbar spine member 98 to threadably engage apertures 121 in the lumbar mounting bracket 94 to secure the lumbar spine member 98 to the lumbar mounting bracket 94. More in particular, in certain embodiments, the fasteners 108 extend through the apertures 106 in the clamping plates 104, the optional lumbar bushings, and the aperture 100 of respective first or second spaced apart outer leg 502, 504 of the lumbar spine member 98 to threadably engage apertures 121 in the lumbar mounting bracket 94 to secure the respective first or second spaced apart outer legs 502, 504 of the lumbar spine member 98 to the lumbar mounting bracket 94. When secured with the fasteners 108 to the respective outer leg 502, 504, the central recessed region 509 of the main body portion 105 remains spaced from the respective outer leg 502, 504 while the flange portions 107 are positioned adjacent to the terminal end portions 502A, 504A.

The pelvis assembly 22 also includes a lumbar mounting wedge 110 that is positioned between a pair of spaced apart supporting plates 175, 177, with each of the lumbar mounting wedge 110 and supporting plates 175, 175 positioned adjacent to a top surface of the lumbar spine member 98. The flexible lumbar spine member 98 serves as the flexible connection between the lumbar mounting wedge 110 and the lumbar mounting bracket 94 of the crash test dummy 12 (i.e., thus serves as the flexible connection between the pelvis body segment and sacrum of the crash test dummy 12 and the body segment thorax and thoracic spine of the crash test dummy 12). The lumbar mounting wedge 110 defines a notched region 111 and defines a pair of apertures 115. Each of the supporting plates 175, 177 also defines a lower notched region 178, 179.

The pelvis assembly 22 also includes a base clamping plate 116 positioned adjacent to the lower side of the base region 500. The base clamping plate 116 defines a plurality of apertures 119 extending therethrough that receive a respective fastener 123.

As also shown in FIGS. 2-6, in certain embodiments, the pelvis assembly 22 includes a coupling bracket 131 that is disposed onto a top surface of the base region 500 of the lumbar spine member 98. The coupling bracket 131 includes a central base region 133 and a pair of spaced apart finger flanges 137, 139 extending in a transverse, or normal, direction from the ends of the central region 133 in a direction towards the rear of the crash test dummy 12. The central base region 133 defines a plurality of apertures 135 for receipt of the corresponding fasteners 123 that are used to couple or otherwise secure together the base clamping plate 116, the base region 500 of the lumbar spine member 98, and the coupling bracket 131.

When fully assembled, the central base region 133 extends along the top surface of the base region 500 of the lumbar spine member 98 and extends through the notched region 111 between the lumbar mounting wedge 110 and the lumbar spine member 98 and between each of the lower notched regions 178, 178 of the supporting plates 175, 177 and the lumbar spine member 98. Further, each of the pair of spaced apart finger flanges 137, 139 are positioned outward of, and adjacent to, the opposing lateral sides of the respective supporting plates 175, 177 opposite central axis CA.

Figure 5:
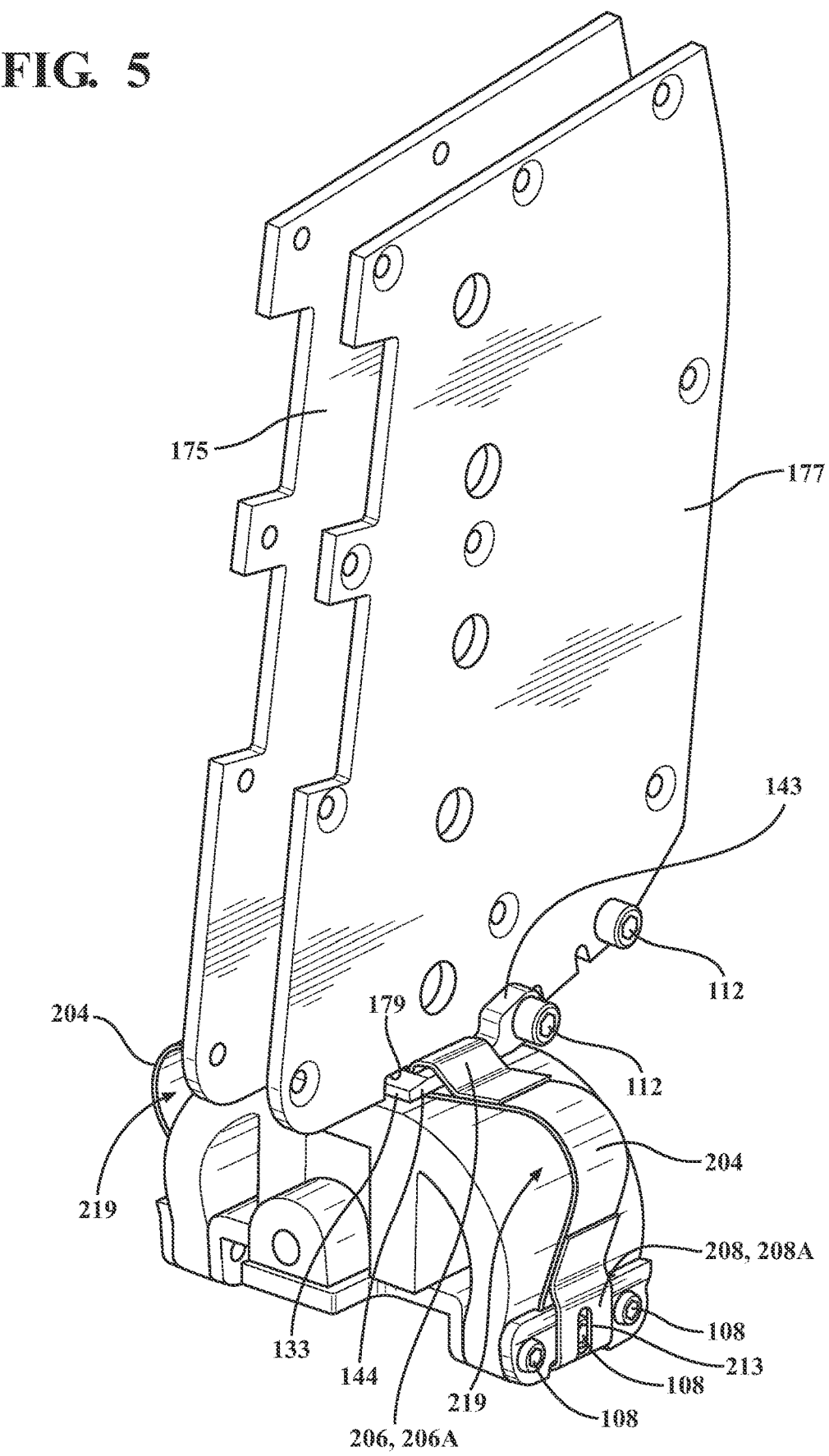
FIG. 5 is a side perspective view of FIG. 4 rotated about 45 degrees relative to FIG. 4.
Figure 6:
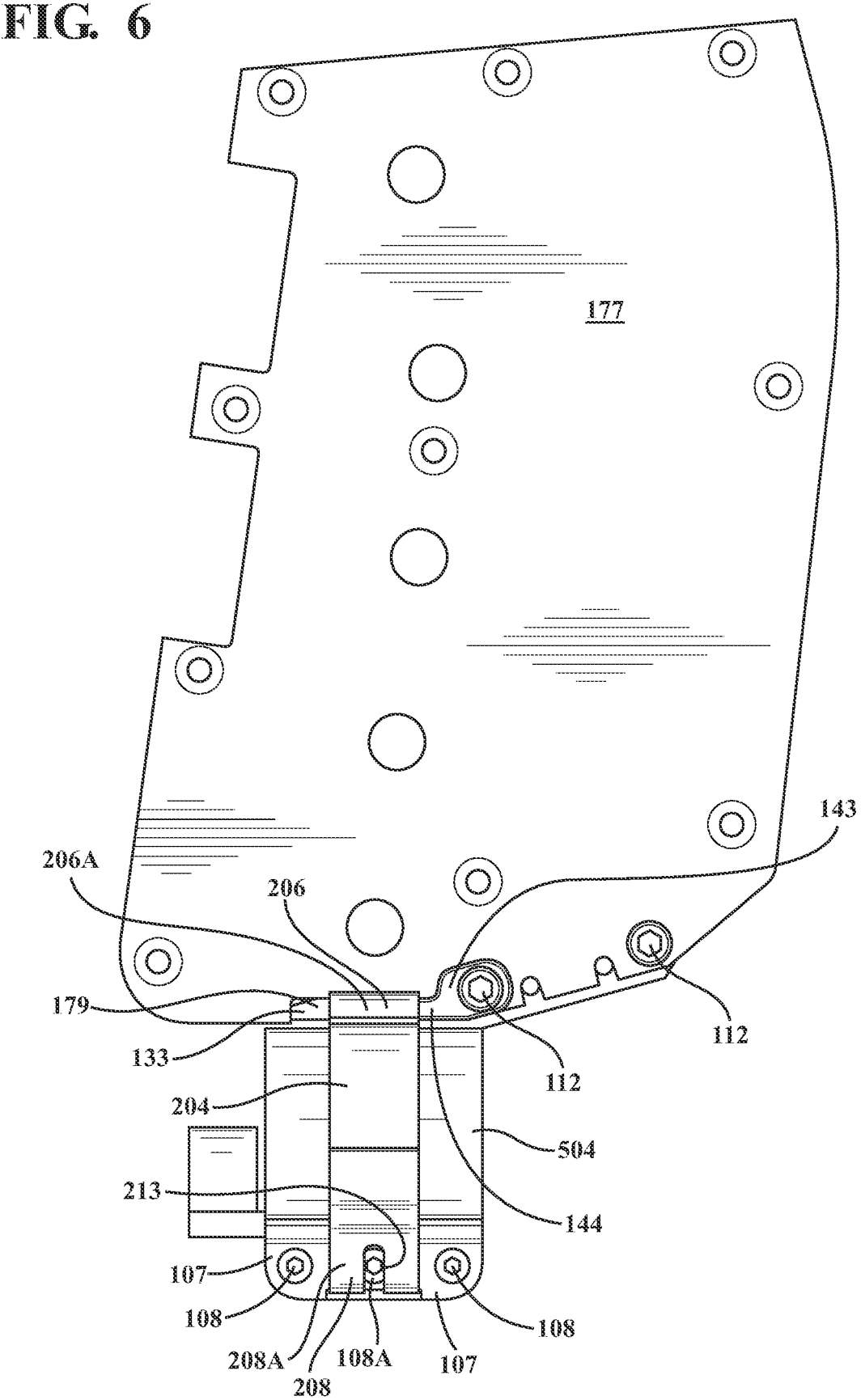
FIG. 6 is a side perspective view of FIG. 4 rotated about 90 degrees relative to FIG. 4.

As best illustrated in FIGS. 2, 5 and 6, each of the pair of spaced apart finger flanges 137, 139 include an inward length region 142, 144 terminating into a belt retaining terminal end 141, 143. The belt retaining terminal ends 141, 143 of the respective spaced apart finger flanges 137, 139 define apertures 145, 147 for receiving fasteners 112 that are used to couple or otherwise secure together the coupling bracket 131 to the lumbar mounting wedge 110 through the respective supporting plate 175, 177.

As also illustrated in three different exemplary embodiments in FIGS. 2-9, the pelvis assembly 22 also includes a lumbar stretch limiter assembly 200 that functions to limit the ultimate stretching of the lumbar spine member 98 during crash simulations, and in particular during side impact crash simulations, and more in particular during far side impact crash simulations. In particular, the lumbar stretch limiter assembly 200 defines a belt assembly 201 having one or more belts that collectively function to limit the ultimate stretching of the lumbar spine member 98 during crash simulations, and in particular during side impact crash simulations, and more in particular during far side impact crash simulations.

In the first embodiment as shown in FIGS. 2-6, the belt assembly 201 includes a pair of belts 202 each having an intermediate portion 204 extending between a first end 206 and a second end 208. In addition, the terminal portion at each of the respective first and second ends 206, 208 is looped over and secured to the intermediate portion 204 of the belt 202. Accordingly, the first and second ends 206, 208 of each one of the respective pair of belts 202 can be further defined as first and second looped ends 206A, 208A having openings 209, 211 therewithin. The second end 208 of each of the belts 202 also defines a slit opening 213. The length of each of the pair of belts 202, measured between the first and second ends 206, 208, is longer than the lengths $L_1$ of the respective outer legs 502, 504. Still further, in certain embodiments, The length of each of the pair intermediate portions 204 are longer than the lengths $L_1$ of the respective outer legs 502, 504.

Each of the belts 202 is coupled to the coupling bracket 131 by inserting a respective one of the pair of spaced apart finger flanges 137, 139 through a respective opening 209 of a respective one of the first looped ends 206A such that the respective first looped ends 206A, 206B of the belts 202 are disposed about the respective inward length region 142, 144 between the respective belt retaining terminal end 141, 143 and the central base region 133. After insertion, the fastener 112 is then inserted through a respective aperture 145, 147 of the belt retaining terminal ends 141, 143 of the respective spaced apart finger flanges 137, 139 and through a respective aperture 115 in the lumbar mounting wedge 110 to secure the coupling bracket 131 to the lumbar mounting wedge 110 with the respective belt 202 retained around the respective one of the pair of spaced apart finger flanges 137, 139.

As also shown in FIGS. 2-6, each of the second loop ends 208A of the belt 202 are coupled around a main body portion 105 of the lumbar clamping plate 104. In particular, a respective lumbar clamping plate 104 is inserted within the opening 211 of a respective one of the second looped ends 208A such that the respective second looped end 208A of the belt 202 is disposed around the central recessed region 109 of the main body portion 105 between the pair of flange portions 107. The respective fasteners 108 are then inserted through a respective aperture 106 in the lumbar clamping plate 104 and through a respective aperture 100 in the terminal end 502A, 504A of the lumbar spine member 98 and through a respective aperture 121 in the lumbar mounting bracket 94 couple or otherwise secure to secure the respective first or second spaced apart outer leg 502, 504 between the lumbar spine member 98 and the lumbar mounting bracket 94 with the second end 208A of a respective belt 202 retained between the respective flange portions 107 of the lumbar clamping plate 104 and the respective outer leg 502, 504 of the lumbar spine member 98 within the flexing gap 219 created between the central recessed region 109 and the exterior surface of the terminal end 502A, 504A of the respective outer leg 502, 504 and within the pair of flange portions 507. This flexing gap 219 is created because the length of each of the pair intermediate portions 204 are longer than the lengths $L_1$ of the respective outer legs 502, 504.

As illustrated, and owing to the arrangement of the second end 208A of the respective belt 202 relative to the respective lumbar clamping plate 104, one 108A of the fasteners 108 is also inserted through the slit opening 213 prior to being inserted within the corresponding aperture 106 in the lumbar clamping plate 104 as a part of this fastening process.

Accordingly, while the first and second ends 206, 208 of each one of the respective belts 202 are secured with the respective fasteners 112, 108, to each of the lumbar spine member 98 and the lumbar mounting wedge 110 (see FIG. 5) the intermediate portion 204 of each of the respective belts 202 remain loose and free to move independently of the lumbar spine member 98 and the lumbar mounting wedge 110. Accordingly, when the crash test dummy 12 is utilized in side impact crash simulations, and in particular during far side impact crash simulations, the belts 202 of the lumbar stretch limiter assembly 200 allows the elastic lumbar spine member 98 to flex within the confines of the respective belts 202 in response to the side impact in a manner consistent with a lumbar spine region of a human, but prevents the lumbar spine member 98 from flexing beyond what is consistent with the lumbar spine region of a human. In particular, during the stretching of the lumbar spine member 98 in a first direction or second direction opposite the first direction during a far side impact crash simulation, the intermediate portion 204 of one of the respective belts 202 (depending upon the direction of stretching of the elastic lumbar spine member 98 corresponding to the particular side of the far side impact simulation) is brought into contact with the elongating lumbar spine member 98 at a maximum allowable limit corresponding to a natural response of the lumbar spine region of a human but prevents the further elongation of the lumbar spine member 98 beyond a natural response of the lumbar spine region of a human.

Prior to the side impact crash simulations, as illustrated in FIGS. 2 and 4-6, the intermediate portion 204 of each of the respective pair of belts 202 is spaced relative to the lumbar spine member 98 (and is hence loose and free as described above) to define a flexing gap 219, with the space defining of the flexing gap 219 designed to correspond to the maximum allowable limit corresponding to a natural response of the lumbar spine region of a human during a side impact condition.

Accordingly, during a side impact simulation directed along one side of the crash test dummy 12 relative to the central axis CA, the lumbar spine member 98 is elongated in a direction to one side of the central axis CA, the elongation of the lumbar spine member 98 is such that an outer surface of the lumbar spine member 98 is brought into contact with the inner surface 204A of the respective intermediate portion 204 of the belt 1202. Once in contact with the inner surface 204A of the respective intermediate portion 204, the lumbar spine member 98 cannot elongate any further away from the central axis CA. Hence, the respective belt 202 limits the elongation of the lumbar spine member 98 to a predefined distance from the central axis CA during a side impact crash simulation corresponding to a natural response of the lumbar spine region of a human during a side impact condition.

Figure 8:
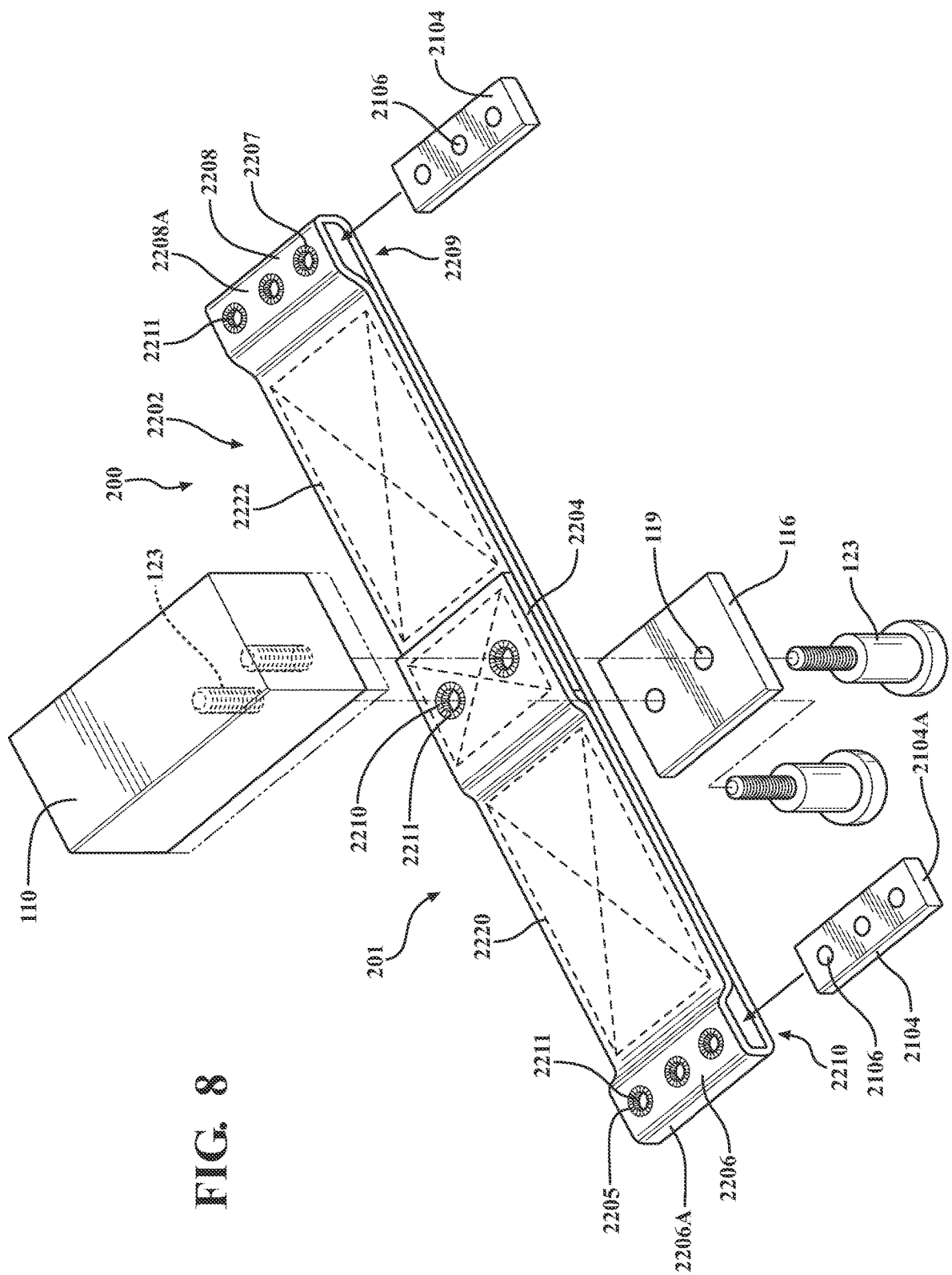
FIG. 8 is an exploded view of a lumbar spine stretch limiter assembly for use in a pelvis assembly in accordance with yet another embodiment.
Figure 9:
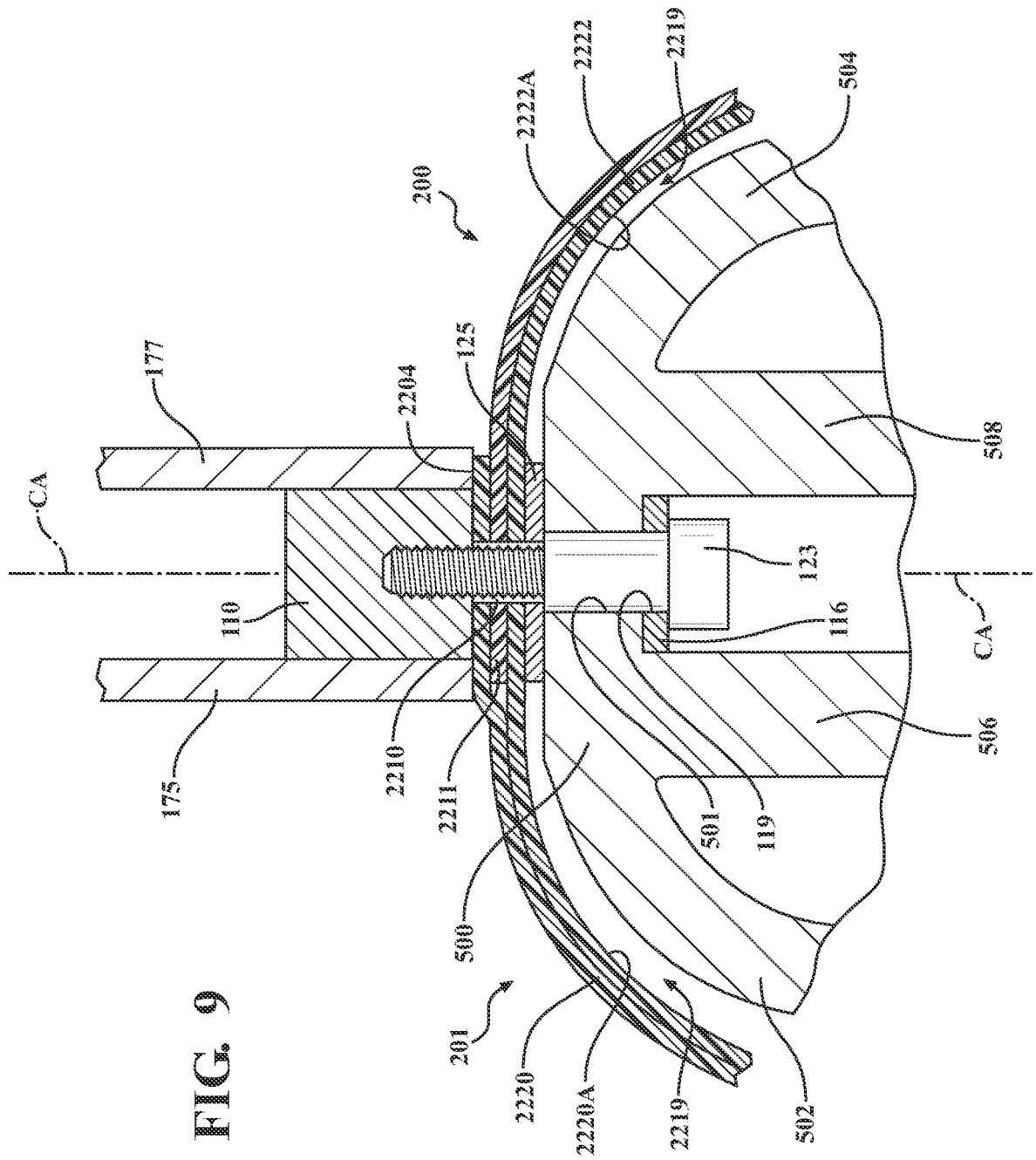
FIG. 9 is a partial section view of a pelvis assembly including the lumbar spine stretch limiter assembly of FIG. 8 in an assembled state.

In an alternative embodiment to the use of a pair of belts 202 in one embodiment as in FIGS. 2-6, the lumbar stretch limiter assembly 200 and belt assembly 201 in alternative embodiments of FIGS. 7 and 8-9 can include a single belt 1202 or 2202, as described below. In these alternative embodiments, components that are common between the pelvis assembly 22 of FIGS. 2-6 and FIG. 7 or FIGS. 8-9 are identified by the same reference number for ease of description.

Figure 7:
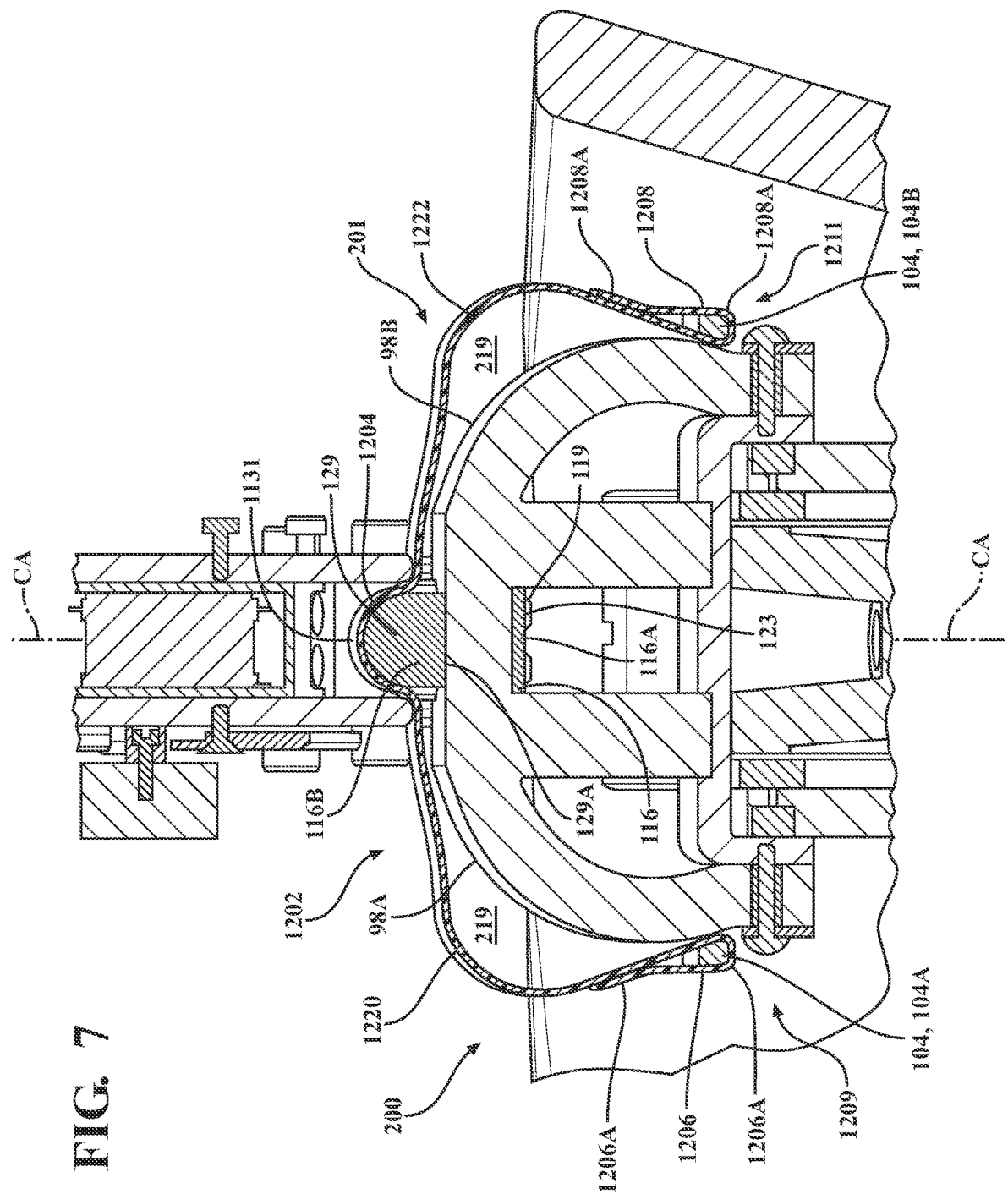
FIG. 7 is a partial section view of a pelvis assembly including a lumbar spine stretch limiter assembly in accordance with another embodiment.

Referring first to FIG. 7, the belt assembly 1201 according to a second embodiment includes a single belt 1202 having a central portion 1204 extending between a first end 1206 and a second end 1208.

In addition, the terminal portion 1206A, 1208A at each of the respective first and second ends 1206, 1208 is looped over and secured to an intermediate portion 1220, 1222 of the belt 1202, with the intermediate portions 1220, 1222 defined between the central portion 1204 and the respective first and second ends 1206, 1208 so as to further define the first and second ends 1206, 1208 as first and second looped ends 1206A, 1206B having openings 1209, 1210 therewithin.

In FIG. 7, each of the first and second loop ends 1206A, 1208A of the belt 1202 are coupled around a main body portion 105 of the lumbar clamping plate 104. In particular, a respective lumbar clamping plate 104 is inserted within the opening 1209, 1211 of a respective one of the first and second looped ends 1206A, 1208A such that the respective one of the first and second looped ends 1206A, 1208A of the belt 1202 is disposed around the central recessed region 109 of the main body portion 105 between the pair of flange portions 107. The respective fasteners 108 are then inserted through a respective aperture 106 in the lumbar clamping plate 104 and through a respective aperture 100 in the terminal end 502A, 504A of the lumbar spine member 98 and through a respective aperture 121 in the lumbar mounting bracket 94 to couple or otherwise secure to secure the respective first or second spaced apart outer leg 502, 504 between the lumbar spine member 98 and the lumbar mounting bracket 94 with respective one of the first and second looped ends 1206A, 1208A of the belt 1202 retained between the respective lumbar clamping plate 104 and the respective outer leg 502, 504 of the lumbar spine member 98. As illustrated, and owing to the arrangement of the second end 208A of the respective belt 202 relative to the respective lumbar clamping plate 104, one 108A of the fasteners 108 is also inserted through the slit opening 213 prior to being inserted within the corresponding aperture 106 in the lumbar clamping plate 104 as a part of this fastening process.

As also shown in FIG. 7 and owing to the use of a single belt 1202 as compared with the pair of belts 202 as shown in FIGS. 2-6, the use of a coupling bracket 131 for coupling the pair of belts to the lumbar mounting wedge 110 is not necessary. Instead, the base clamping plate 116 extends around the lumbar spine member 98 so as to define a top portion 116B disposed adjacent to a top surface of the base region 500 between the lumbar spine member 98 and the lumbar mounting wedge 110 and a bottom portion 116A disposed adjacent to the bottom surface of the base region 500. The top portion 116B has a domed region 129. The domed region 129 defined a plurality of apertures (not shown) extending from the lower surface 129A which is positioned adjacent to the corresponding apertures 135 in the central base region 133. A respective fastener 123 is inserted through each set of the corresponding aligned apertures in the bottom portion 116A of the base clamping plate 116, the lumbar spine member 98 and the domed region 129 to couple or otherwise secure together the base clamping plate 116 and the base region 500 of the lumbar spine member 98.

The central portion 1204 of the belt 1202 is positioned onto an upper curved surface 1131 of the domed region 129 and adjacent to a corresponding lower curved surface 133 of the lumbar mounting wedge 110. The belt 1202 is thus allowed to self-center on the domed region 129 with less slack on the intermediate portions 1220, 1222 of the belt 1202 than in the absence of the domed region 129 to allow for more limited control of the lumbar spine member 98 during side impact crash simulations (i.e., wherein less slack in the belt 1202 allows for more limited movement of the lumbar spine member 98 to prevent unnatural lumbar spine elongation).

Accordingly, when the crash test dummy 12 is utilized in side impact crash simulations, and in particular during far side impact crash simulations, the belt 1202 of the lumbar stretch limiter assembly 200 allows the elastic lumbar spine member 98 to flex within the confines of the belt 1202 in response to the side impact in a manner consistent with a lumbar spine region of a human but prevents the lumbar spine member 98 from flexing beyond what is consistent with lumbar spine region of a human. In particular, one or the other of the intermediate portions 1220, 1222 of the belt 1202 is brought into contact with the elongating lumbar spine member 98 (depending upon the direction of the far side impact crash test simulation) at a maximum allowable limit corresponding to a natural response of the lumbar spine region of a human but prevents the further elongation of the lumbar spine member 98 beyond a natural response of the lumbar spine region of a human. Stated another way, the belt 1202 of the lumbar stretch limiter assembly 200 prevents over-stretching of the lumbar in a far side condition, while not affecting shear behavior between the sacrum and the thoracic spine in the near side condition.

Prior to the side impact crash simulations, as illustrated in FIG. 7, the pair of intermediate portions 1220, 1222 of the belt 1202 are each spaced relative to the lumbar spine member 98 (and is hence loose and free as described above) to define a respective flexing gap 1219, with the space defining of the respective flexing gap 1219 designed to correspond to the maximum allowable limit corresponding to a natural response of the lumbar spine region of a human during a side impact condition. Similar to the first embodiment of FIGS. 2-6, the length of each of the pair of intermediate portions 1220, 1222 of the belt 1202 are longer than the lengths $L_1$ of the respective outer legs 502, 504 so as to provide for the flexing gap 1219.

Accordingly, during a side impact simulation directed along one side of the crash test dummy 12 relative to the central axis CA, the lumbar spine member 98 is elongated in a direction to one side of the central axis CA, the elongation of the lumbar spine member 98 is such that an outer surface of the lumbar spine member 98 is brought into contact with the inner surface 1220A, 1222A of the respective intermediate portion 1220, 1222 of the belt 1202. Once in contact with the inner surface 1220A, 1222A of the respective intermediate portion 1220, 1222, the lumbar spine member 98 cannot elongate any further away from the central axis CA. Hence, the belt 1202 limits the elongation of the lumbar spine member 98 to a predefined distance from the central axis CA during a side impact crash simulation corresponding to a natural response of the lumbar spine region of a human during a side impact condition.

In still another alternative embodiment, as shown in FIGS. 8-9, the belt assembly 201 includes a single belt 2202 having a central portion 2204 extending between a first end 2206 and a second end 2208. The central portion 2204 defines one or more apertures 2210 (here shown as two apertures 2010). In addition, the terminal end portions 2206A, 2208A at each of the respective first and second ends 2206, 2208 is looped over and secured to an intermediate portion 2220, 2222 of the belt 2202, with the intermediate portions 2220, 2222 defined between the central portion 2204 and the respective first and second ends 2206, 2208 so as to further define the first and second ends 2206, 2208 as first and second looped ends 2206A, 2206B having openings 2209, 2210 therewithin. The terminal end portions 2206A, 2208A of the first and second looped ends 2206A, 2208A also define a plurality of apertures 2205, 2207 corresponding in size and position to the apertures 2106 in the lumbar clamping plate 2104. In particular, such as shown in FIG. 8, the lumbar clamping plate 2104 includes a pair of lumbar clamping plates 2104A and 2104B respectively coupled to, and disposed on, opposing sides 98A, 98B of the lumbar spine member 98 relative a central axis CA. In certain embodiments, bushings 2211 may be introduced within the respective apertures 2205, 2207, 2210 within the belt 2202.

In the embodiment of FIGS. 8-9, as opposed to the single belt 1202 of FIG. 7, the central portion 2204 of the single belt 2202 of this embodiment is not loose to allow self-alignment but is instead secured between the lumbar mounting wedge 110 and the lumbar spine member 98. In particular, the apertures 2210 are configured to receive a corresponding one of the fasteners 123. In particular, as best shown in FIG. 9, the pelvis assembly 22 includes the one or more fasteners 123, and preferably a plurality of fasteners 123, such as screws extending through the apertures 119 in the base clamping plate 116, and through the apertures 501 in the base portion 500 of the lumbar spine member 98 (see FIG. 9), and through the apertures 2210 in the central portion 2204 of the belt 1202 to threadably engage the lumbar mounting wedge 110 to secure the lumbar mounting wedge 110 to the lumbar spine member 98 with the central portion 1204 of the belt 202 interposed and secured therebetween. As also illustrated in FIG. 5, a washer 125 may be positioned onto the fastener 118 between the central portion 2204 of the belt 2202 and the upper surface of the lumbar spine member 98, While not shown in FIGS. 8-9, a plurality of fasteners (similar to fasteners 108 in FIGS. 2-6) such as screws extending through the apertures 2205, 2207 in the first and second looped ends 2206A, 2208A, the apertures 2106 in the respective lumbar clamping plates 2104, 2104A, 2104B, the apertures 100 in the lumbar spine member 98, and into the apertures 121 in the lumbar mounting bracket 94 can be used to secure the first and second looped ends 2206A, 2208A and the lumbar clamping plates 2104, 2104A, 2104B to the lumbar spine member 98 and lumbar mounting bracket 94 in a manner similar to that described through the use of the lumbar clamping plates 104, 104A, 104B in the embodiments of FIGS. 2-6 above.

Accordingly, in the embodiment illustrated in FIGS. 8-9, while the first and second ends 2206, 2208 of the belt 2202 and the central portion 2204 of the belt 2202 are secured, the intermediate portions 2220, 2222 of the belt 2202 remain loose and free to move independently of the lumbar spine member 98 and the lumbar mounting wedge 110. Accordingly, when the crash test dummy 12 is utilized in side impact crash simulations, and in particular during far side impact crash simulations, the belt 2202 of the lumbar stretch limiter assembly 200 allows the elastic lumbar spine member 98 to flex within the confines of the belt 2202 in response to the side impact in a manner consistent with a lumbar spine region of a human, but prevents the lumbar spine member 98 from flexing beyond what is consistent with lumbar spine region of a human. In particular, one or the other of the intermediate portions 2220, 2222 of the belt 2202 is brought into contact with the elongating lumbar spine member 98 (depending upon the direction of the far side impact crash test simulation) at a maximum allowable limit corresponding to a natural response of the lumbar spine region of a human but prevents the further elongation of the lumbar spine member 98 beyond a natural response of the lumbar spine region of a human.

Prior to the side impact crash simulations, as similar to the belt 1202 as described and illustrated in FIG. 8-9, the pair of intermediate portions 2220, 2222 of the belt 1202 are each spaced relative to the lumbar spine member 98 (and is hence loose and free as described above) to define a respective flexing gap 2219, with the space defining of the respective flexing gap 2219 designed to correspond to the maximum allowable limit corresponding to a natural response of the lumbar spine region 98 of a human during a side impact condition. Similar to the first embodiment of FIGS. 2-6, the length of each of the pair of intermediate portions 2220, 2222 of the belt 1202 are longer than the lengths $L_1$ of the respective outer legs 502, 504 so as to provide for the flexing gap 2219.

Accordingly, during a side impact simulation directed along one side of the crash test dummy 12 relative to the central axis CA, the elongation of the lumbar spine member 98 is such that an outer surface of the lumbar spine member 98 is brought into contact with the inner surface 2220A, 2222A of the respective intermediate portion 2220, 2222 of the belt 2202. Once in contact with the inner surface 2220A, 2222A of the respective intermediate portion 2220, 2222, the lumbar spine member 98 cannot elongate any further away from the central axis CA. Hence, the belt 2202 limits the elongation of the lumbar spine member 98 to a predefined distance from the central axis CA during a side impact crash simulation corresponding to a natural response of the lumbar spine region of a human during a side impact condition.

In summary, the additional elongation of the lumbar spine member 98 of the crash test dummy 12 in FIGS. 1-9, in the absence of a lumbar stretch limiter assembly 200, can contribute to differences in far side impact crash test simulation data in head excursion data when the crash test dummy 12 is only restricted in the pelvis area by a lap belt and a vehicle center console, and thus an accurate far side impact crash simulation does not occur. In particular, lumbar shear, lumbar stretch, and lumbar bending relative the X-axis (i.e., axis CA as illustrated) caused by the additional elongation of the elastic lumbar spine member 98 during far side impact testing are believed to contribute to head excursion variation. The inclusion of the lumbar stretch limiter assembly 200 to the crash test dummy 12 according to any one of the embodiments of FIGS. 2-9 above thus addresses this issue by limiting lumbar shear, lumbar stretch, and lumbar bending in the X-axis and thus is expected to improve reproducibility of head excursion during far side impact crash simulations performed under the same conditions. Still further, the inclusion of the lumbar stretch limiter assembly 200 according to any one of the embodiments of FIGS. 2-9 is not thought to affect or alter near side impact crash simulations. Even still further, the inclusion of the lumbar stretch limiter assembly 200 according to any one of the embodiments of FIGS. 2-9 substantially prevents or otherwise minimizes damage to the lumbar spine member 98 due to overstretching.

The present disclosure also describes a system 1000 for creating a virtual crash test dummy and evaluating the created virtual crash test dummy in a virtual crash test, such as a virtual far side impact crash test, using a software application included on a computer 1030. The system 1000 includes is a virtual representation of the crash test dummy 12 including a virtual representation of the lumbar stretch limiter assembly 200 according to any one of the embodiments of FIGS. 2-9 as described above, including all of the features and components as also described above in FIGS. 2-9.

Figure 10:
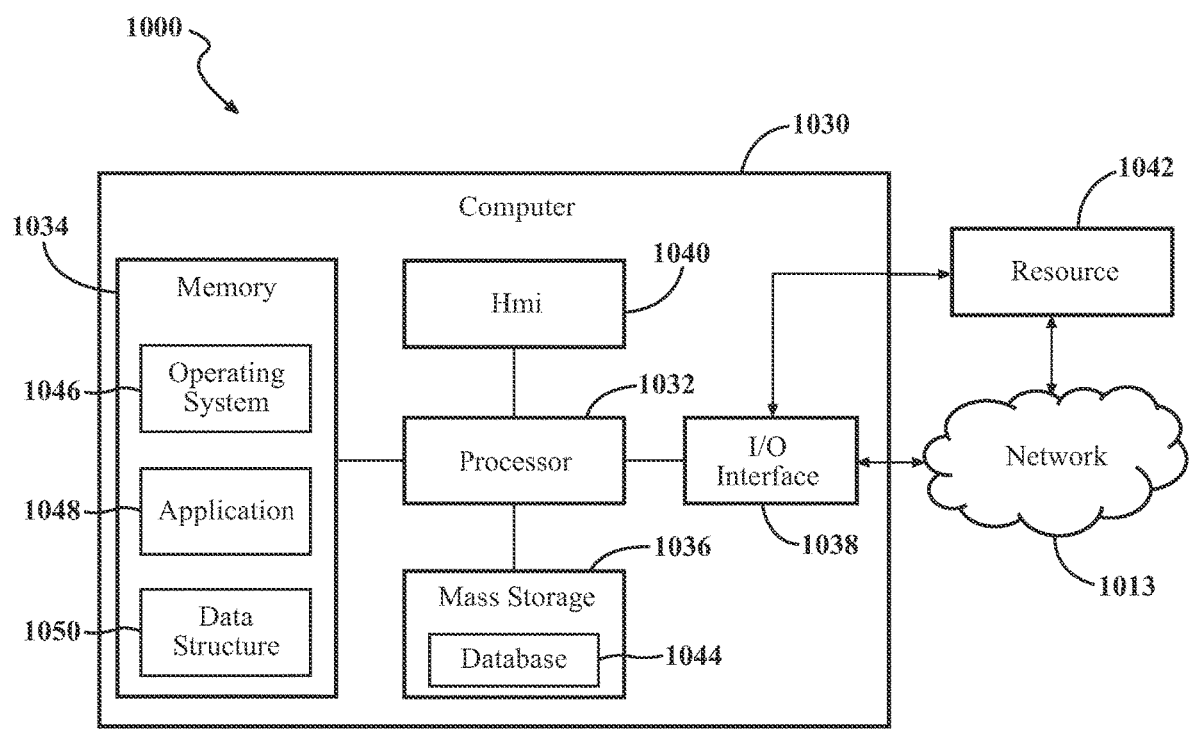
FIG. 10 is a schematic view of a system for creating and evaluating a virtual anthropomorphic test device.

Referring now to FIG. 10, the computer 1030 may include at least one processor 1032, a memory 1034, a mass storage memory device 1036, an input/output (I/O) interface 1038, and a Human Machine Interface (HMI) 1040. The computer 1030 may also be operatively coupled to one or more external resources 1042 via the network 1013 and/or I/O interface 1038. External resources may include, but are not limited to, servers, databases, mass storage devices, peripheral devices, cloud-based network services, or any other suitable computing resource that may be used by the computer 1030.

The processor 1032 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 1044 may reside on the mass storage memory device 1036 and may be used to collect and organize data used by the various systems and modules described herein.

Processor 1032 may operate under the control of an operating system 1046 that resides in memory 1034. The operating system 1046 may manage computing resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1050 may also reside in memory 1034, and may be used by the processor 1032, operating system 1046, and/or application 1048 to store or manipulate data. The software application 1048, as provided herein, includes software applications that create the virtual anthropomorphic test device 10' and software applications that evaluate the created virtual anthropomorphic test device 10' in a virtual crash test setting.

The I/O interface 1038 may provide a machine interface that operatively couples the processor 1032 to other devices and systems, such as the network 1013 and/or external resource 1042. The application 1048 may thereby work cooperatively with the network 1013 and/or external resource 1042 by communicating via the I/O interface 1038 to provide the various features, functions, applications, processes, and/or modules comprising embodiments of the invention. The application 1048 may also have program code that is executed by one or more external resources 1042, or otherwise rely on functions and/or signals provided by other system or network components external to the computer 1030. Indeed, given the nearly endless hardware and software configurations possible, persons having ordinary skill in the art will understand that embodiments of the invention may include applications that are located externally to the computer 1030, distributed among multiple computers or other external resources 1042, or provided by computing resources (hardware and software) that are provided as a service over the network 1013, such as a cloud computing service.

The HMI 1040 may be operatively coupled to the processor 1032 of computer 1030 in a known manner to allow a user of the computer 1030 to interact directly with the computer 1030. The HMI 1040 may include video and/or alphanumeric displays, a touch screen, a speaker, and any other suitable audio and visual indicators capable of providing information to the user. The HMI 1040 may also include input devices and controls such as an alphanumeric keyboard, a pointing device, keypads, pushbuttons, control knobs, microphones, etc., capable of accepting commands or input from the user and transmitting the entered input to the processor 1032.

EXAMPLES

Example 1—Far Side Impact Crash Simulation Using a Far Side Impact Crash Simulator Example 1 illustrates a far side impact crash simulation 5000 of the crash test dummy of FIGS. 2-6 (see FIGS. 11-15), which includes a pair of belts 202 as part of the lumbar stretch limiter assembly 200, that illustrates how the lumbar spine member 98 moves during a side impact condition and further illustrates how the lumbar stretch limiter assembly 200 limits such movement so as to more closely simulate a normal human response of a human spine during a far side impact crash simulation under the same far side impact crash conditions.

FIG. 11 illustrates a side impact crash simulator 5000 used for evaluating far side impact on a crash test dummy. The simulator 5000 is representative of a vehicle, such as an automobile, and includes a seat 5002 having a shoulder harness seat belt 5004. The seat 5002 is positioned adjacent to a side panel structure 5006 that is representative of a door of the vehicle. In particular, as illustrated in FIG. 11, the crash test dummy 10 in accordance with the embodiment of FIGS. 2-6 is shown seated on the seat 5002 and secured with the shoulder harness seat belt 5004 immediately prior to a side impact crash simulation. As also illustrated in FIG. 11, a force (shown by arrow 5008) is shown representing the side impact that will be provided onto the side panel structure 5006. The impact of this force 5008 on the lumbar spine member 98, as a result of this force 5008 being applied to the side panel structure 5006, is illustrated at different time intervals in FIGS. 8-11 as follows.

FIGS. 12-15 only includes the lumbar spine member 98 and portions the lower lumbar bracket 94 and the lumbar mounting wedge 110 and base clamping plate 116 so as to show how the lumbar spine member 98 is elongated relative to the lower lumbar bracket 94 and lumbar mounting wedge 110 at the time intervals provided after the side impact condition within the side impact crash simulator 5000 of FIG. 11 is commenced. Other components of the pelvis assembly 22 have been omitted for ease of illustration.

FIG. 12 illustrates a portion of a pelvis assembly 22 of the crash test dummy 10 forty seven (47) milliseconds after the side impact condition. At this time interval, the lumbar spine member 98 is being elongated in a direction to one side of the central axis CA (rightward as shown in FIG. 12) towards the force 5008 applied. More in particular, the elongation of the lumbar spine member 98 is such that an outer surface of the curved outer leg 504 of the lumbar spine member 98 is being brought into closer proximity with the inner surface 204A of the intermediate portion 204 of the second belt of the pair of belts 202 (i.e., the second belt being the belt 202 of the pair of belts 202 located closest to the side panel structure 5006 as in FIG. 11). At the same time, the outer surface of the curved outer leg 502 of the lumbar spine member 98 remains in spaced relationship with inner surface 204A of the intermediate portion 204 of the first belt of the pair of belts 202 (i.e., the first belt being the belt 202 of the pair of belts 202 located furthest from the side panel structure 5006 in FIG. 11). At the same time, the terminal ends 502A, 504A of each of the outer legs 502, 504 remain fastened to the opposing lumbar clamping plate 104A, 104B and to the sides of the lower lumbar bracket 94.

Still further, each of the inner legs 506, 508 have also shifted in a direction towards the outer leg 504 relative to the central axis CA with the terminal ends 506A, 506B being displaced from the lower lumbar bracket 94 (upward relative to the lower lumbar bracket 94 as shown in FIGS. 2, 4 and 5). As illustrated, the inner leg 506 has shifted rightward and is now generally aligned with the central axis CA.

FIG. 13 illustrates the portion of a pelvis assembly 22 sixty (60) milliseconds after the pendulum impact condition. FIG. 13 is representative of the pendulum impact condition having the maximum allowable displacement of the lower lumbar member 98 as controlled by the lumbar stretch limiter assembly 200.

At this sixty (60) millisecond time interval, the lumbar spine member 98 remains elongated in a direction to one side of the central axis CA (rightward as shown in FIG. 13) towards the side panel structure 5006, wherein the elongation of the lumbar spine member 98 is such that an outer surface of the curved outer leg 504 of the lumbar spine member 98 is brought into contact with the inner surface 204A of the intermediate portion 204 of the second belt 202 and is thus displaced rightward of the central axis CA to the greatest extent possible as limited by the intermediate portion 204 of the second belt 202. At the same time, the outer surface of the curved outer leg 502 of the lumbar spine member 98 is being moved into closer proximity, or into contact with, the inner surface 204A of the intermediate portion 204 of the first belt 202 as the first belt of the pair of belts 202 is straightening due to the movement of the lumbar mounting wedge 110 in response to the movement of the base region 500 of the lumbar spine member 98 upward away from the lower lumbar bracket 94 and towards the force 5008. Similar to FIG. 12, the terminal ends 502A, 504A of each of the outer legs 502, 504 remain fastened to the opposing lumbar clamping plate 104A, 104B and to the sides of the lower lumbar bracket 94.

Still further, each of the inner legs 506, 508 have also shifted further in a direction towards side panel structure 5006 relative to the central axis CA with the terminal ends 506A, 506B remaining displaced from the lower lumbar bracket 94. As illustrated, the inner leg 506 has shifted further rightward and is now positioned rightward of the central axis CA along with the inner leg 508. Moreover, the inner leg 508 has been brought into contact with the curved outer leg 504 with its length now extending at an angle relative to the central axis CA. Still further, the inner leg 506 is also angled relative to the central axis CA, and also at an angle relative to the inner leg 508, such that the inner leg 506 has been brought into contact with the terminal end 508A of the inner leg 508.

FIG. 14 illustrates the portion of a pelvis assembly 22 ninety seven (97) milliseconds after the side impact condition, which as illustrated refers to instant just after the time wherein the lumbar spine member 98 has achieved the maximum elongation against the second belt of the pair of belts 202 as described in FIG. 13.

At this ninety seven (97) millisecond time interval, the forces of the intermediate portion 204 of the second belt 202 have pushed the lumbar spine member 98 back towards the central axis CA and away from the side panel structure 5006 resulting in the curved leg 504 being pushed out of contact with the intermediate portion 204 of the second belt 202. At the same time, the curved leg 502 of the lumbar spine member 98 remains in contact with the intermediate portion of the first belt 202. Similar to FIGS. 13 and 14, the terminal ends 502A, 504A of each of the outer legs 502, 504 remain fastened to the opposing lumbar clamping plate 104A, 104B and to the sides of the lower lumbar bracket 94.

However, at this ninety seven (97) millisecond time interval, the base region 500 of the lumbar spine member 98 has moved in a direction further away from the lower lumbar bracket 94 (upward as shown in FIG. 14) and away from the force 5008, which in turn causes the inner legs 506, 508 to move further upward in response.

Still further, the inner legs 506, 508 shift in a direction towards the outer leg 502 and away from the side panel structure 5006 relative to the central axis CA with the terminal ends 506A, 506B being displaced from the lower lumbar bracket 94 further than in FIG. 13. In FIG. 14, and similar to FIG. 13, the inner legs 506, 508 each remain slightly angled relative to the central axis CA, with the outer leg 506 still remains in contact with the terminal end 508A of the inner leg 508.

FIG. 15 illustrates the portion of a pelvis assembly 22 one hundred twenty nine (129) milliseconds after the pendulum impact condition, corresponding to the completion time of the pendulum impact condition. At this one hundred twenty nine (129) milliseconds time interval, the forces of the intermediate portion 204 of the second belt 202 pushing on the curved outer leg 508 are dissipated, resulting in the outer legs 506, 508 being returned to a spaced relationship with the inner surface 204A of the intermediate portion 204 of the respective one of the pair of belts 202. Similar to FIG. 12-14, the terminal ends 502A, 504A of each of the outer legs 502, 504 remain fastened to the opposing lumbar clamping plate 104A, 104B and to the sides of the lower lumbar bracket 94.

Still further, the base 500 of the lumbar spine member 98 has moved in a direction towards the lower lumbar bracket 94 (downward as shown in FIG. 15), which in turn causes the inner legs 506, 508 to move downward in response.

While specific time intervals are provided in FIGS. 12-15 relating to particular conditions for the side impact condition provided, such a time interval are just representative to show how the lumbar stretch limiter assembly functions in one example and should not be considered limiting.

Example 2—Far Side Impact Crash Simulation Using a Pendulum Far Side Impact Crash Simulator Example 2 illustrates a far side pendulum impact crash simulation (FIGS. 16-22) of the crash test dummy of FIGS. 2-6 that illustrates how the lumbar spine member 98 moves during a pendulum side impact condition and further illustrates how the lumbar stretch limiter assembly 200 limits such movement so as to more closely simulate a normal human response of a human spine during a pendulum far side impact crash simulation under the same far side impact crash conditions.

FIG. 16 illustrates a pendulum side impact crash simulator 6000 used for evaluating far side impact on a crash test dummy. The simulator 6000 is representative of a vehicle, such as an automobile, and includes a seat 6002 having a shoulder harness seat belt 6004. A pendulum device 6006 is positioned adjacent to one side of the seat 6002.

The pendulum device 6006 includes a probe 6008 hanging from a wire 6010. The probe 6008, as illustrated in FIG. 16, is in the form of a tube having a diameter of about 15 centimeters and a mass of about 23 kilograms. The probe 6008 is swung along an arc 6012, resulting in a force (shown by arrow 6014) being applied to the side of one of the pelvic bone members 70, 72 (shown as the pelvic bone member 72 according to FIG. 2). The impact of this force 6014 on the lumbar spine member 98 is illustrated at different time intervals in FIGS. 17-22 as follows.

Similar to Example 1 above, FIGS. 17-22 only includes the lumbar spine member 98 and portions the lower lumbar bracket 94 and the lumbar mounting wedge 110 so as to show how the lumbar spine member 98 is elongated relative to the lower lumbar bracket and lumbar mounting wedge at the time intervals provided after the pendulum side impact condition within the pendulum side impact crash simulator 6000 of FIG. 16 is commenced. Other components of the pelvis assembly 22, including other portions of the lumbar stretch limiter assembly 200 and specifically the belts 202, 204 have been omitted. However, the effect of such components on the lumbar spine member 98 are described.

FIG. 17 illustrates a portion of a pelvis assembly 22 of the crash test dummy 10 immediately before the pendulum side impact condition is commenced, corresponding to zero (0) milliseconds. Accordingly, the portion of the pelvis assembly 22 is as described above with respect to FIGS. 2-6, and not repeated here for brevity.

FIG. 18 illustrates a portion of a pelvis assembly 22 of the crash test dummy 10 twenty (20) milliseconds after the side impact condition. At this time interval, the lumbar spine member 98 is being elongated in a direction to one side of the central axis CA (rightward as shown in FIG. 18) towards the force 6014 applied. More in particular, the elongation of the lumbar spine member 98 is such that an outer surface of the curved outer leg 504 of the lumbar spine member 98 is being brought into closer proximity with the inner surface 204A of the intermediate portion 204 of the second belt of the pair of belts 202 (i.e., the second belt being the belt 202 of the pair of belts 202 located closest to the pendulum device 6006 as in FIG. 16). At the same time, the outer surface of the curved outer leg 502 of the lumbar spine member 98 remains in spaced relationship with inner surface 204A of the intermediate portion 204 of the first belt of the pair of belts 202 (i.e., the first belt being the belt 202 of the pair of belts 202 located furthest from the pendulum device 6006 in FIG. 16). At the same time, the terminal ends 502A, 504A of each of the outer legs 502, 504 remain fastened to the opposing lumbar clamping plate 104A, 104B and to the sides of the lower lumbar bracket 94.

Still further, each of the inner legs 506, 508 have also shifted in a direction towards the outer leg 504 relative to the central axis CA with the terminal ends 506A, 506B being displaced from the lower lumbar bracket 94 (upward relative to the lower lumbar bracket 94 as shown in FIG. 18). As illustrated, the inner legs 506, 508 have both shifted in a direction towards the force 6014 and are now each position between the curved outer leg 504 and the central axis CA. Moreover, the inner leg 508 has been brought into contact with the curved outer leg 504 with its length now extending at an angle relative to the central axis CA. Still further, the inner leg 506 is also angled relative to the central axis CA, and also at an angle relative to the inner leg 508, such that the inner leg 506 has been brought into contact with the terminal end 508A of the inner leg 508.

FIG. 19 illustrates the portion of a pelvis assembly 22 twenty eight (28) milliseconds after the pendulum impact condition. FIG. 19 which as illustrated refers to instant just before or at the time wherein the lumbar spine member 98 has achieved the maximum elongation against the second belt of the pair of belts 202 as described in FIG. 18.

At this twenty eight (28) millisecond time interval, the lumbar spine member 98 remains elongated in a direction to one side of the central axis CA (rightward as shown in FIG. 19) towards the side panel structure 5006, wherein the elongation of the lumbar spine member 98 is such that an outer surface of the curved leg 506 of the lumbar spine member 98 is brought into contact with the inner surface 204A of the intermediate portion 204 of the second belt 202 and is thus displaced rightward (as shown in FIG. 19) of the central axis CA to the greatest extent possible as limited by the intermediate portion 204 of the second belt 202. At the same time, the outer surface of the curved leg 502 of the lumbar spine member 98 is being moved into closer proximity, or into contact with, the inner surface of the intermediate portion 204 of the first belt 202 as the first belt of the pair of belts 202 is straightening due to the upward and rightward movement of the base region 500 of the lumbar spine member 98. Similar to FIGS. 17 and 18, the terminal ends 502A, 504A of each of the outer legs 502, 504 remain fastened to the opposing lumbar clamping plate 104A, 104B and to the sides of the lower lumbar bracket 94.

Still further, each of the inner legs 506, 508 have also shifted further in a direction towards probe 6008 and away from the central axis CA relative to FIG. 19 with the terminal ends 506A, 506B remaining displaced from the lower lumbar bracket 94 due to the upward and rightward movement of the base region 500 of the lumbar spine member 98. Still further, the inner leg 506 is also angled relative to the central axis CA, and also at an angle relative to the inner leg 508, such that the inner leg 506 has been brought into contact with the terminal end 508A of the inner leg 508. Still further, the baes portion 500 of the lumbar spine member 98 has moved in a direction away from the lower lumbar bracket 94 (upward as shown in FIG. 19), which in turn causes the inner legs 506, 508 to move away from the lower lumbar bracket (i.e., upward as shown in FIG. 19) in response.

FIG. 20 illustrates the portion of a pelvis assembly 22 forty (40) milliseconds after the pendulum impact condition. FIG. 20 which as illustrated refers to instant just after the time wherein the lumbar spine member 98 has achieved the maximum elongation against the second belt of the pair of belts 202 as described in FIG. 19.

At this forty (40) millisecond time interval, the forces of the intermediate portion 204 of the second belt of the pair of belts 202 have pushed the lumbar spine member 98 back towards the central axis CA resulting in the curved leg 504 being pushed out of contact with the inner surface 204A of the intermediate portion 204 of the second belt 202. At the same time, the curved leg 502 of the lumbar spine member 98 remains in contact with the inner surface 204A of the intermediate portion of the first belt 202. Similar to FIGS. 17-19, the terminal ends 502A, 504A of each of the outer legs 502, 504 remain fastened to the opposing lumbar clamping plate 104A, 104B and to the sides of the lower lumbar bracket 94.

In addition, at this forty millisecond (40) time interval, the base region 500 of the lumbar spine member 98 continues to be moved in a direction away from the lower lumbar bracket 94 (upward as shown in FIG. 20), which in turn causes the inner legs 506, 508 to move further away from the lower lumbar bracket 94 (i.e., upward as shown in FIG. 20) in response.

Still further, the inner legs 506, 508 shift in a direction towards the outer leg 502 and away from the curved outer leg 504 in a direction towards the central axis CA with the terminal ends 506A, 506B being displaced from the lower lumbar bracket 94 further than in FIG. 19. In FIG. 20, and similar to FIG. 19, the inner legs 506, 508 each remain slightly angled relative to the central axis CA, with the outer leg 506 still remains in contact with the terminal end 508A of the inner leg 508.

FIG. 21 illustrates the portion of a pelvis assembly 22 fifty (50) milliseconds after the pendulum impact condition.

At this fifty millisecond (50) time interval, the forces of the intermediate portion 204 of the second belt of the pair of belts 202 have continued to push the lumbar spine member 98 back towards the central axis CA resulting in the curved leg 504 being pushed further out of contact with the intermediate portion 204 of the second belt 202 as compared with FIG. 20. At the same time, the curved leg 502 of the lumbar spine member 98 is beginning to come out of contact with the inner surface 204A of the intermediate portion of the first belt of the pair of belts 202. Similar to FIG. 17-20, the terminal ends 502A, 504A of each of the outer legs 502, 504 remain fastened to the opposing lumbar clamping plate 104A, 104B and to the sides of the lower lumbar bracket 94.

In addition, the base region 500 of the lumbar spine member 98 is moving in a direction towards the lower lumbar bracket 94 (downward as shown in FIG. 21 as compared to FIG. 20), which in turn causes the inner legs 506, 508 to move towards the lower lumbar bracket 94 (i.e., downward as shown in FIG. 21) in response.

Still further, the inner legs 506, 508 shift in a direction towards the outer leg 502 and away from the curved outer leg 504 in a direction towards the central axis CA with the terminal ends 506A, 506B being displaced from the lower lumbar bracket 94 closer than in FIGS. 19 and 20. In FIG. 21, and similar to FIGS. 17-20, the inner legs 506, 508 each remain slightly angled relative to the central axis CA, with the outer leg 506 still remains in contact with the terminal end 508A of the inner leg 508.

FIG. 22 illustrates the portion of a pelvis assembly 22 sixty (60) milliseconds after the pendulum impact condition, corresponding to the completion time of the pendulum impact condition. At this sixty (60) milliseconds time interval, the forces of the intermediate portion 204 of the second belt 202 pushing on the curved outer leg 508 are dissipated, resulting in the outer legs 506, 508 being returned to a spaced relationship with the intermediate portion 204 of the respective one of the pair of belts 202. Similar to FIG. 17-21, the terminal ends 502A, 504A of each of the outer legs 502, 504 remain fastened to the opposing lumbar clamping plate 104A, 104B and to the sides of the lower lumbar bracket 94.

Still further, the base region 500 of the lumbar spine member 98 has continued to move in a direction towards the lower lumbar bracket 94 (downward as shown in FIG. 22), which in turn causes the inner legs 506, 508 to move further towards the lower lumbar bracket 94 (i.e., downward as shown in FIG. 22) in response.

While specific time intervals are provided in FIGS. 17-22 relating to particular conditions for the side impact condition provided, such a time interval are just representative to show how the lumbar stretch limiter assembly functions in one example and should not be considered limiting.

As illustrated in both Example 1 and Example 2, the pair of belts 202 of the lumbar stretch limiter assembly 200 limit the amount of stretch of the elastic lumbar spine member 98 during side impact crash simulations. Stated another way, the lumbar stretch limiter assembly 200 prevents overstretching of the lumbar spine member 98 in a far side condition during side impact crash simulations in accordance with Examples 1 and 2.

The present disclosure has been described in an illustrative manner. It is to be understood that the terminology, which has been used, is intended to be in the nature of words of description rather than of limitation.

Many modifications and variations of the present disclosure are possible in light of the above teachings. Therefore, the present disclosure may be practiced other than as specifically described.

What is claimed is:

1. A crash test dummy comprising:
    a lumbar mounting bracket defining a central axis,
    a lumbar spine member attached to said lumbar mounting bracket with said lumbar spine member formed from an elastomeric material,
    a pair of lumbar clamping plates coupled on opposing sides of said lumbar spine member relative to said central axis; and
    a belt system mounted to both of said pair of lumbar clamping plates for limiting a stretching movement of said lumbar spine member relative to said central axis and relative to said lumbar mounting bracket during a crash simulation.

2. The crash test dummy according to claim 1, wherein said belt system is at least partially spaced from said lumbar spine member so as to define a flexing gap for permitting movement of said lumbar spine member relative to said central axis.

3. The crash test dummy according to claim 1, wherein said belt system comprises a pair of belts each including an intermediate portion extending between a first end and a second end with each of said second ends respectively mounted to a corresponding one of said pair of lumbar clamping plates,
    wherein said intermediate portion of each one of said pair of belts is spaced from said lumbar spine member so as to define a flexing gap between said intermediate portion of each one of said pair of belts and said lumbar spine member.

4. The crash test dummy according to claim 3, wherein said lumbar spine member comprises:
    a base region positioned along said central axis;
    a pair of outer legs extending outwardly away from opposing sides of the base region relative to said central axis, with a terminal end of each of said pair of outer legs coupled to a respective one of said pair of lumbar clamping plates; and
    a pair of inner legs extending from said base region in a direction towards said lumbar mounting bracket, with said pair of inner legs disposed within said pair of outer legs on opposing sides of said central axis.

5. The crash test dummy according to claim 4, wherein a length of said intermediate portion of each of said pair of belts is greater than a length $L_1$ of each one of said pair of outer legs.

6. The crash test dummy according to claim 3 further comprising:
    a lumbar mounting wedge coupled to said lumbar spine member;

a pair of spaced apart supporting plates coupled to opposing sides of said lumbar mounting wedge; and a coupling bracket disposed on said lumbar spine member, said coupling bracket having a central base region and a pair of spaced apart finger flanges extending transverse from said central base region, with each one of said pair of spaced apart finger flanges coupled to a respective one of said pair of spaced apart supporting plates such that said respective one of said pair of supporting plates is disposed between said lumbar mounting wedge and said respective one of said pair of spaced apart finger flanges, wherein said first end of a respective one of said pair of belts is coupled to a respective one of said pair of spaced apart finger flanges and wherein said first end of said respective other one of said pair of belts is coupled to a respective other one of said pair of spaced apart finger flanges.

7. The crash test dummy according to claim 6 further comprising:

a base clamping plate coupled to lumbar spine member such that said lumbar spine member is disposed between said coupling bracket and said base clamping plate; and one or more fasteners for securing said lumbar spine member to each of said coupling bracket and said base clamping plate.

8. The crash test dummy according to claim 6, wherein each one of said pair of belts includes an intermediate portion extending between a first looped end and a second looped end, with each of said first and second looped ends defining an opening, wherein a respective one of said pair of spaced apart finger flanges is inserted within said opening of said first looped end of a corresponding respective one of said pair of belts, and wherein a respective one of said pair of lumbar clamping plates is inserted within said opening of said second looped end of a corresponding respective one of said pair of belts.

9. The crash test dummy according to claim 1, wherein said belt system comprises a single belt including an intermediate portion extending between a first end and a second end with each of said first and second ends respectively mounted to a corresponding one of said pair of lumbar clamping plates, wherein said intermediate portion of said belt is spaced from said lumbar spine member so as to define a flexing gap between said intermediate portion and said lumbar spine member.

10. The crash test dummy according to claim 9, wherein said single belt includes a central portion extending between a first end and a second end, and wherein said intermediate portion comprises a pair of intermediate portions, with a first one of said pair of intermediate portions extending between said central portion and said first end and with a second one of said pair of intermediate portions extending between said central portion and said second end.

11. The crash test dummy according to claim 9, wherein said first end of said belt comprises a first looped end and wherein said second end of said belt comprises a second looped end, with each of said first and second looped ends defining an opening, wherein a respective one of said pair of lumbar clamping plates is inserted within said opening of said first looped end and a respective other one of said pair of lumbar clamping plates is inserted within said opening of said second looped end.

12. The crash test dummy according to claim 9 further comprising a base clamping plate disposed adjacent to a bottom surface and a top surface of said lumbar spine member with said base clamping plate including a domed region disposed adjacent said top surface between said lumbar spine member and said lumbar mounting wedge, said domed region having an upper curved surface, wherein said central portion of said belt is positioned onto said upper curved surface of said domed region and adjacent to a corresponding lower curved surface of said lumbar mounting wedge.

13. The crash test dummy according to claim 9 further comprising one or more fasteners for securing said lumbar mounting wedge to said lumbar spine member with said central portion of said belt interposed between said lumbar mounting wedge and said lumbar spine member.

14. The crash test dummy according to claim 9, wherein said lumbar spine member comprises:

a base region positioned along said central axis;

a pair of outer legs extending outwardly away from opposing sides of the base region relative to said central axis, with a terminal end of each of said pair of outer legs coupled to a respective one of said pair of lumbar clamping plates; and a pair of inner legs extending from said base region in a direction towards said lumbar mounting bracket, with said pair of inner legs disposed within said pair of outer legs on opposing sides of said central axis.

15. The crash test dummy according to claim 14, wherein a length of each of said pair of intermediate portions is greater than a length $L_1$ of each one of said pair of outer legs.

16. The crash test dummy according to claim 1 further comprising one or more fasteners for mounting said belt system to a respective one of said pair of lumbar clamping plates, said lumbar spine member, and said lumbar mounting bracket.

17. The crash test dummy according to claim 1, wherein said lumbar spine member comprises:

a base region positioned along said central axis;

a pair of outer legs extending outwardly away from opposing sides of the base region relative to said central axis, with a terminal end of each of said pair of outer legs coupled to a respective one of said pair of lumbar clamping plates; and a pair of inner legs extending from said base region in a direction towards said lumbar mounting bracket, with said pair of inner legs disposed within said pair of outer legs on opposing sides of said central axis.

18. The crash test dummy according to claim 17, wherein a length $L_1$ of each one of said pair of outer legs is greater than a corresponding length $L_2$ of each one of said pair of inner legs.

19. The crash test dummy according to claim 17, wherein each of said pair of lumbar clamping plates comprises:

a main body portion coupled to said belt system; and a pair of flange portions extending inwardly from said main body portion in a direction towards said central axis and towards said terminal ends of said pair of outer curved legs, wherein said main body portion includes a central recessed region, and wherein said belt system is retained within a gap defined between said central recessed region, said terminal end of a respective one of said outer legs, and said pair of flange portions.

20. The crash test dummy according to claim 1 further comprising a lumbar mounting wedge coupled to said lumbar spine member.

\* \* \* \* \*